US012639199B2

(12) United States Patent
Ammar et al.

(10) Patent No.: US 12,639,199 B2
(45) Date of Patent: May 26, 2026

(54) SWARM MANAGEMENT

(71) Applicant: Hereford Zone Holdings, LLC, Sparks Glencoe, MD (US)

(72) Inventors: Philip George Ammar, Cleveland Heights, OH (US); Ronald Charles Krosky, Cockeysville, MD (US); Brendan Edward Clark, Rocky River, OH (US)

( * ) Notice: Subject to any disclaimer, the term of this patent is extended or adjusted under 35 U.S.C. 154(b) by 654 days.

(21) Appl. No.: 17/145,393

(22) Filed: Jan. 10, 2021

(65) Prior Publication Data

US 2021/0349816 A1     Nov. 11, 2021

Related U.S. Application Data

(60) Continuation of application No. 15/849,475, filed on Dec. 20, 2017, now abandoned, which is a division of application No. 14/720,808, filed on May 24, 2015, now Pat. No. 9,857,792, which is a continuation of application No. 13/194,944, filed on Jul. 30, 2011, now Pat. No. 9,043,021.

(60) Provisional application No. 61/429,353, filed on Jan. 3, 2011.

(51) Int. Cl.
| | |
|---|---|
| *G06F 11/3668* | (2025.01) |
| *G06F 3/0481* | (2022.01) |
| *G06F 11/32* | (2006.01) |
| *G06F 11/34* | (2006.01) |
| *G06F 11/3698* | (2025.01) |

(52) U.S. Cl.
CPC ........ *G06F 11/3692* (2013.01); *G06F 3/0481* (2013.01); *G06F 11/323* (2013.01); *G06F 11/3414* (2013.01); *G06F 11/3438* (2013.01);

*G06F 11/3672* (2013.01); *G06F 11/3684* (2013.01); *G06F 11/3688* (2013.01); *G06F 11/3698* (2025.01)

(58) Field of Classification Search
CPC ............. G06F 11/3692; G06F 11/3664; G06F 11/3684; G06F 11/3688
USPC ......................................................... 717/125
See application file for complete search history.

(56) References Cited

U.S. PATENT DOCUMENTS

| | | | | |
|---|---|---|---|---|
| 2003/0055718 | A1* | 3/2003 | Cimini ................... | G06Q 10/06 705/7.41 |
| 2004/0070920 | A1* | 4/2004 | Flueli .................... | G06F 9/4411 361/500 |
| 2004/0162638 | A1* | 8/2004 | Solomon .............. | G05D 1/0088 700/247 |
| 2005/0193080 | A1* | 9/2005 | Gold ................... | H04L 41/0866 709/208 |
| 2005/0256610 | A1* | 11/2005 | Orita .................... | G05D 1/0251 700/248 |

(Continued)

FOREIGN PATENT DOCUMENTS

WO      WO 2011/144245 A1 * 11/2011

*Primary Examiner* — Bradford F Wheaton
(74) *Attorney, Agent, or Firm* — Shannon McCue

(57) ABSTRACT

Systems, methods, and other embodiments associated with swarm management are described. One example system comprises a communication component configured to establish a communication link with at least one element, where the at least one element is part of a swarm. The example system also comprises a management component configured to manage performance of a task list by the swarm through the communication link.

20 Claims, 18 Drawing Sheets

(56) References Cited

U.S. PATENT DOCUMENTS

| 2005/0288808 | A1* | 12/2005 | Lopez | G06Q 30/018 |
| | | | | 700/117 |
| 2009/0011397 | A1* | 1/2009 | Writer | G09B 5/00 |
| | | | | 434/350 |
| 2009/0313310 | A1* | 12/2009 | Thome | H04W 84/18 |
| | | | | 707/999.203 |
| 2011/0126136 | A1* | 5/2011 | Abella | H04L 63/1408 |
| | | | | 715/764 |
| 2012/0088523 | A1* | 4/2012 | Shirakawa | H04L 67/52 |
| | | | | 455/456.3 |
| 2013/0073727 | A1* | 3/2013 | Souza | H04L 67/1059 |
| | | | | 709/224 |

* cited by examiner

1700

1705

1710

SWARM MANAGEMENT

CROSS REFERENCE TO RELATED APPLICATIONS

This application claims the benefit of and is a continuation of U.S. patent application Ser. No. 15/859,475, filed on Dec. 30, 2017, issuing as U.S. Pat. No. 10,891,157. This application claims the benefit of and is a divisional patent application of U.S. patent application Ser. No. 14/720,808 filed on May 24, 2015, issued as U.S. Pat. No. 9,857,752, which is hereby wholly incorporated by reference. U.S. patent application Ser. No. 14/720,808 claims the benefit of and is a continuation of U.S. patent application Ser. No. 13/194,944 filed on Jul. 30, 2011, issued as U.S. Pat. No. 9,043,021, which is hereby wholly incorporated by reference. U.S. patent application Ser. No. 13/194,944 claims the benefit of U.S. provisional application Ser. No. 61/429,353 filed on Jan. 3, 2011, which is hereby wholly incorporated by reference.

BACKGROUND

A user can desire for a task to be performed and manually manage completion of this task. For example, the user can desire to clean a tile floor in their kitchen. The user can first use a dust pan and broom to remove large pieces of debris, such as food particles. The user can then use a vacuum to remove smaller pieces of debris, such as pet hair. The user can then use a mop to remove other debris, such as marks left by a bottom of a shoe. This process may take a considerable amount of time for the user, may be physically straining on the user, and may be undesirable for the user.

BRIEF DESCRIPTION OF THE FIGURES

The accompanying drawings, which are incorporated in and constitute a part of the detailed description, illustrate various example systems, methods, and other example embodiments of various innovative aspects. These drawings include.

Figure 1:
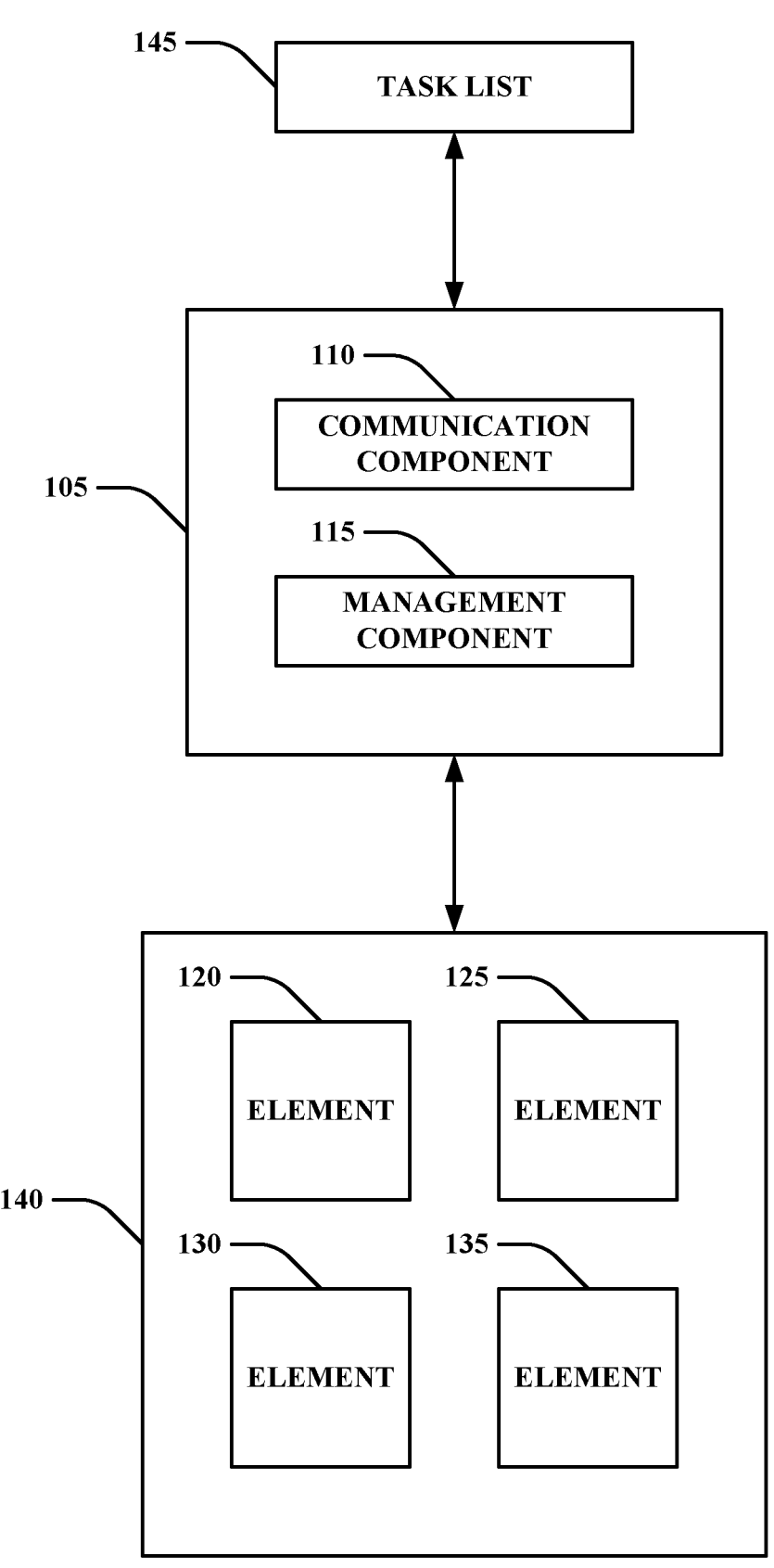
FIG. 1 illustrates one embodiment of a system that includes a communication component and a management component.

It will be appreciated that illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale. These elements and other variations are considered to be embraced by the general theme of the figures, and it is understood that the drawings are intended to convey the spirit of certain features related to this application, and are by no means regarded as exhaustive or fully inclusive in their representations. Additionally, it is to be appreciated that the designation 'FIG.' represents 'Figure'. In one example, 'FIG. 1' and 'Figure 1' are referring to the same drawing.

The terms 'may' and 'can' are used to indicate a permitted feature, or alternative embodiments, depending on the context of the description of the feature or embodiments. In one example, a sentence states 'A can be AA' or 'A may be AA'. Thus, in the former case, in one embodiment A is AA, and in another embodiment A is not AA. In the latter case, A may be selected to be AA, or A may be selected not to be AA. However, this is an example of A, and A should not be construed as only being AA. In either case, however, the alternative or permitted embodiments in the written description are not to be construed as injecting ambiguity into the appended claims. Where claim 'x' recites A is AA, for instance, A is not to be construed as being other than AA for purposes of claim 'x'. This construction is so despite any permitted or alternative features and embodiments described in the written description.

DETAILED DESCRIPTION

Described herein are example systems, methods, and other embodiments associated with swarm management. In one embodiment, a swarm can be a group of two or more entities that function with swarm intelligence. A swarm element can be another swarm, allowing the application of swarm hierarchies, sub-swarms, super-swarms, swarms of swarms, etc. In one embodiment, swarm intelligence can be a coordination of these entities, realized by collective behavior in at least partial support of the coordination, when the entities are decentralized and/or self-organized. These entities can interact with one another as well as with their environment. A swarm of these entities can be managed by a system, according to a method, and others (e.g., operated according to a set of computer-readable instructions).

The following example is provided to give a high-level overview of swarm management. This example is used in the detailed description to explain aspects disclosed herein. It is to be appreciated by one of ordinary skill in the art that this example is merely provided for explanation purposes and is not intended to limit the scope of aspects disclosed herein. In this example, a user can employ two robotic vacuum cleaners—'cleaner A' and 'cleaner B'—that can perform a cleaning without user effort. However, it is to be appreciated that other examples can be practiced, such as cleaner A and cleaner B performing the cleaning along with the user (e.g., the user is vacuuming concurrently with cleaner A and cleaner B, the user is mopping while cleaner A and cleaner B are vacuuming, etc.). The user can be in charge of a large wooden floor and turn both the cleaners 'on' such that both cleaners proceed to vacuum the floor. The floor can be divisible into four quarters—northeast, northwest, southwest, and southeast. In one embodiment, these cleaners can independently clean the floor.

However, this independent cleaning may be inefficient. In one example, cleaner A and cleaner B can be limited in battery life such that they have enough batteries to clean two quarters. In one operation, cleaner A may clean the northeast quarter of the floor first and then proceed to clean the southeast quarter of the floor. Cleaner B may clean the northwest quarter first and then proceed to clean the northeast quarter of the floor. Thus, the northwest quarter is cleaned twice while the southwest quarter is not cleaned. It may be desirable for each quarter to be cleaned once. Swarm intelligence can be used to reach this desirable result.

Cleaner A can be turned on first by the user, evaluate the floor, determine a cleaning solution (e.g., segregate the floorspace into four quarters), and select a quarter (e.g., select a quarter cleaner A is initially placed in, select a quarter in response to a direct user instruction, etc.). For example, cleaner A can select the northeast quarter and periodically send a message that it is cleaning the northeast quarter. When cleaner B is turned on, cleaner B can receive the message and select the northwest quarter. When cleaner A finishes the northeast quarter, cleaner A can select the southeast quarter and send an appropriate message to cleaner B that the northeast corner is finished and that cleaner A is cleaning the southeast corner. Then, when cleaner B finishes the northwest quarter, cleaner B can select the southwest quarter in response to the message. Thus, the independent cleaners A and B can function together as a swarm to complete a task. Even this relatively simple task can be considerably more complex, when considering such concepts multiple simultaneously-actuated swarm devices that must deconflict or establish hierarchies, self-actuating devices, sentry and standby devices that continuously evaluate or wait in reserve, multi-step cleaning processes, and so forth. Regardless of complexity or unforeseen variables, solutions to these and other situations are readily cognizable under swarm intelligence architecture described herein.

While aspects discussed herein relate to cleaning (e.g., vacuuming, mopping, etc.) a floor or surface, it is to be appreciated that these are by no means a limiting example of where aspects disclosed herein can be practiced. Other examples include computing and related electrical and computer technology, information aggregation and processing, information organization and management, medical technology, scientific experimentation, nanotechnology, military technology, manufacturing, communication systems (e.g., networks of satellites, ground relay stations, communication security to include coordination of channels and encryption, etc.) maintenance (e.g., physical maintenance of a plant or machine, cleaning of an area, or disk maintenance in a data facility, etc.), distribution and logistics (e.g., restocking shelves from a supply closet, moving heavy equipment internationally piecemeal or together, etc.), construction and physical engineering (e.g., stacking bricks, encountering a water obstacle and implementing the best means of crossing it, etc.), gaming, distributed management or control systems (e.g., factory control systems, information technology hubs, etc.), etc. Upon consideration of the disclosures herein, those skilled in the art will recognize the application of these techniques in other settings where more than one devices sharing common functionality is engaged in a dividable task. It is to be appreciated that this list of other examples are not intended to be limiting with regard to where aspects disclosed herein can be practiced.

While these provide particular aspects of at least one embodiment, other applications involving different features, variations or combinations of aspects will be apparent to those skilled in the art based on the following details relating to the drawings and other portions of this application. Additionally, when a reference is made herein to a person, it is to be appreciated that the reference can be made not just to a human, but also to a non-human organism or a non-living system.

The following paragraphs include definitions of selected terms discussed at least in the detailed description. The definitions may include examples used to explain features of terms and are not intended to be limiting. In addition, where a singular term is disclosed, it is to be appreciated that plural terms are also covered by the definitions. Conversely, where a plural term is disclosed, it is to be appreciated that a singular term is also covered by the definition. In addition, a set can include one or more member(s).

References to "one embodiment", "an embodiment", "one example", "an example", and so on, indicate that the embodiment(s) or example(s) so described may include a particular feature. The embodiment(s) or example(s) are shown to highlight one feature and no inference should be drawn that every embodiment necessarily includes that feature. Multiple usages of the phrase "in one embodiment" and others do not necessarily refer to the same embodiment; however this term may refer to the same embodiment. It is to be appreciated that multiple examples and/or embodiments may be combined together to form another embodiment.

"Computer-readable medium", as used herein, refers to a medium that stores signals, instructions, and/or data. A computer may access a computer-readable medium and read information stored on the computer-readable medium. In one embodiment, the computer-readable medium stores instruction and the computer can perform those instructions as a method. The computer-readable medium may take forms, including, but not limited to, non-volatile media (e.g., optical disks, magnetic disks, and so on), and volatile media (e.g., semiconductor memories, dynamic memory, and so on). Example forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, and other media from which a computer, a processor or other electronic device can read.

"Component", "logic", "module", "interface" and the like as used herein, includes but is not limited to hardware, firmware, software stored or in execution on a machine, a routine, a data structure, and/or at least one combination of these (e.g., hardware and software stored). Component, logic, module, and interface may be used interchangeably. A component may be used to perform a function(s) or an action(s), and/or to cause a function or action from another component, method, and/or system. A component may include a software controlled microprocessor, a discrete logic (e.g., ASIC), an analog circuit, a digital circuit, a programmed logic device, a memory device containing instructions, a process running on a processor, a processor, an object, an executable, a thread of execution, a program, a computer and so on. A component may include one or more gates, combinations of gates, or other circuit components. Where multiple components are described, it may be possible to incorporate the multiple components into one physical component. Similarly, where a single component is described, it may be possible to distribute that single component between multiple physical components. In one embodiment, the multiple physical components are distributed among a network. By way of illustration, both/either a controller and/or an application running on a controller can be one or more components.

FIG. 1 illustrates one embodiment of a system 105 that includes a communication component 110 and a management component 115. The communication component 110 can be configured to establish a communication link with at least one element (e.g., element 120, 125, 130, or 135). The element can be a physical element, logical element, component, etc. The at least one element is part of a swarm 140. The management component 115 can be configured to manage performance of a task list 145 (e.g., one or more tasks) by the swarm 140 through the communication link.

Returning to the vacuum example discussed above, at least part of the system 105 can reside within or on cleaner A. The system 105 can broadcast an open message (e.g., a message that can be received by another cleaner in a certain area). Cleaner B can receive the message. In at least one embodiment, cleaner B can respond (although this may not occur depending on the application). Cleaner B receiving the message sent from cleaner A can be one embodiment of communication link establishment. In one embodiment, after cleaner B responds, the system 105 can establish a communication link (secure or insecure, direct or via hub/proxy, etc.) between cleaner A and cleaner B (or another cleaner, 'cleaner C,' where the communication link can be exclusively between cleaners A and C; be open to cleaners A, B and C; be two separate communications between and A and B, and A and C; etc.).

The management component 115 can establish and/or evaluate the task list 145. In one embodiment, a user can propagate the task list 145 (e.g., add items to the task list 145 from a personal electronic device (e.g., a personal computer, smartphone, etc.), speak individual tasks that are added to the task list 145 (e.g., the system 105 includes a microphone that can evaluate user speech and perform a function (e.g., adding an item to the task list 145) based on this text), etc.). In another embodiment, the task list can be generated by an element's own monitoring capabilities or onboard programming. An element 120-135 and/or the system 105 can retain a computer-readable medium that stores at least part of the task list 145. The management component 115 can evaluate to determine tasks for completion. Based on this evaluation, the management component 115 can determine how the swarm 140 should perform one or more individual tasks of the task list 145. The task list 145 can include multiple tasks or a single task. If multiple tasks are included, these tasks can (but need not be) be related (e.g., remove dust from floor, mop floor), dependent (e.g., remove dust from floor, mop floor after dust is removed), unrelated (e.g., remove dust from floor, back-up memory), etc. In one embodiment, a single task is repeatable (e.g., clean the floor every 12 hours). Individual tasks can be time dependent (e.g., remove dust from floor between LOAM and 11 AM), situation dependent (e.g., remove dust from floor when no one is home), etc. The task list can include parameters on how an individual task is performed and/or when the task is completed (e.g., when dust removal occurs for 'Y' minutes, when 'X'% of dust particles are removed from the floor, when 'Z' dust particles per square inch is achieved, etc.).

In one embodiment, tasks of the task list 145 can be assigned initially. For example, the task list 145 can include tasks A, B, C, D, and E. Element 120 can be assigned task A, element 125 can be assigned task B, element 130 can be assigned task C, and element 135 can be assigned task D and E initially. In one embodiment, tasks of the task list 145 can be assigned progressively. For example, the task list 145 can include tasks A, B, C, D, and E. Element 120 can be assigned task A, element 125 can be assigned task B, element 130 can be assigned task C, and element 135 can be assigned task D initially. A first element to complete their task can then be assigned task E. Therefore, a task is not assigned until a free element is available. It is to be appreciated by one of ordinary skill in the art that task assignment can be more complex. For example, element capabilities, projected time to complete a task, actual time to complete a task, etc. can be used in task assignment.

Figure 2:
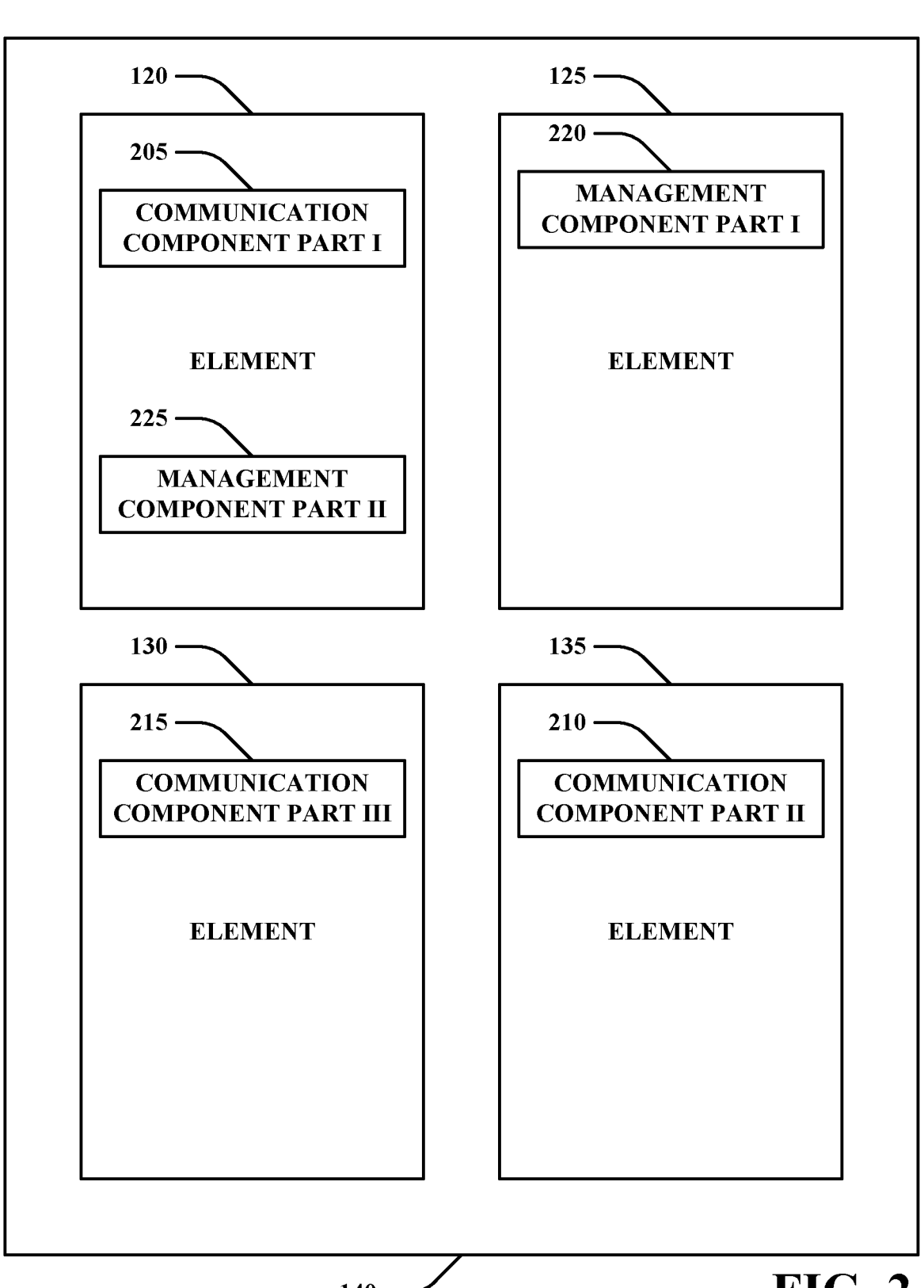
FIG. 2 illustrates one embodiment of a swarm with elements.

FIG. 2 illustrates one embodiment of the swarm 140 with elements 120, 125, 130, and 135. The communication component 110 of FIG. 1 and management component 115 of FIG. 1 can be distributed across at least two elements of the swarm 140. In one embodiment, parts of components can reside on different elements. For example, the communication component 110 of FIG. 1 can be distributed (e.g., equally, non-equally, at least partially redundantly) across elements 120, 135, and 130 as communication component part I 205, communication component part II 210, and communication component part III 215 respectively. In one embodiment, part I 205, part II 210, and part III 215 are redundancies of one another, allowing each element of elements 120, 135, or 130 to function exclusively with the communication component 110. It is to be appreciated that the communication component 110 of FIG. 1 can be of, for example, four parts, with part II being distributed upon element 125 or also distributed across an already used element (e.g., element 135 includes communication component part II 210 and a fourth part of the communication component 110 of FIG. 1). While the communication component 110 of FIG. 1 is distributed, the management component 115 of FIG. 1 can be localized to one element or also distributed across at least two elements of the swarm 140. In one example, the management component 115 of FIG. 1 can be in two parts (e.g., management component part I 220 on element 125 and management component part II 225 on element 120). In one example, if the management component part II 225 alone manages performance of a task list by the swarm through the communication link and the communication part I 205 establishes a communication link with at least one element (e.g, a link between element 120 and element 125, not necessarily requiring a communication part in both), then the element 120 can include the system 105 of FIG. 1 despite other parts being associated with other elements.

Figure 3:
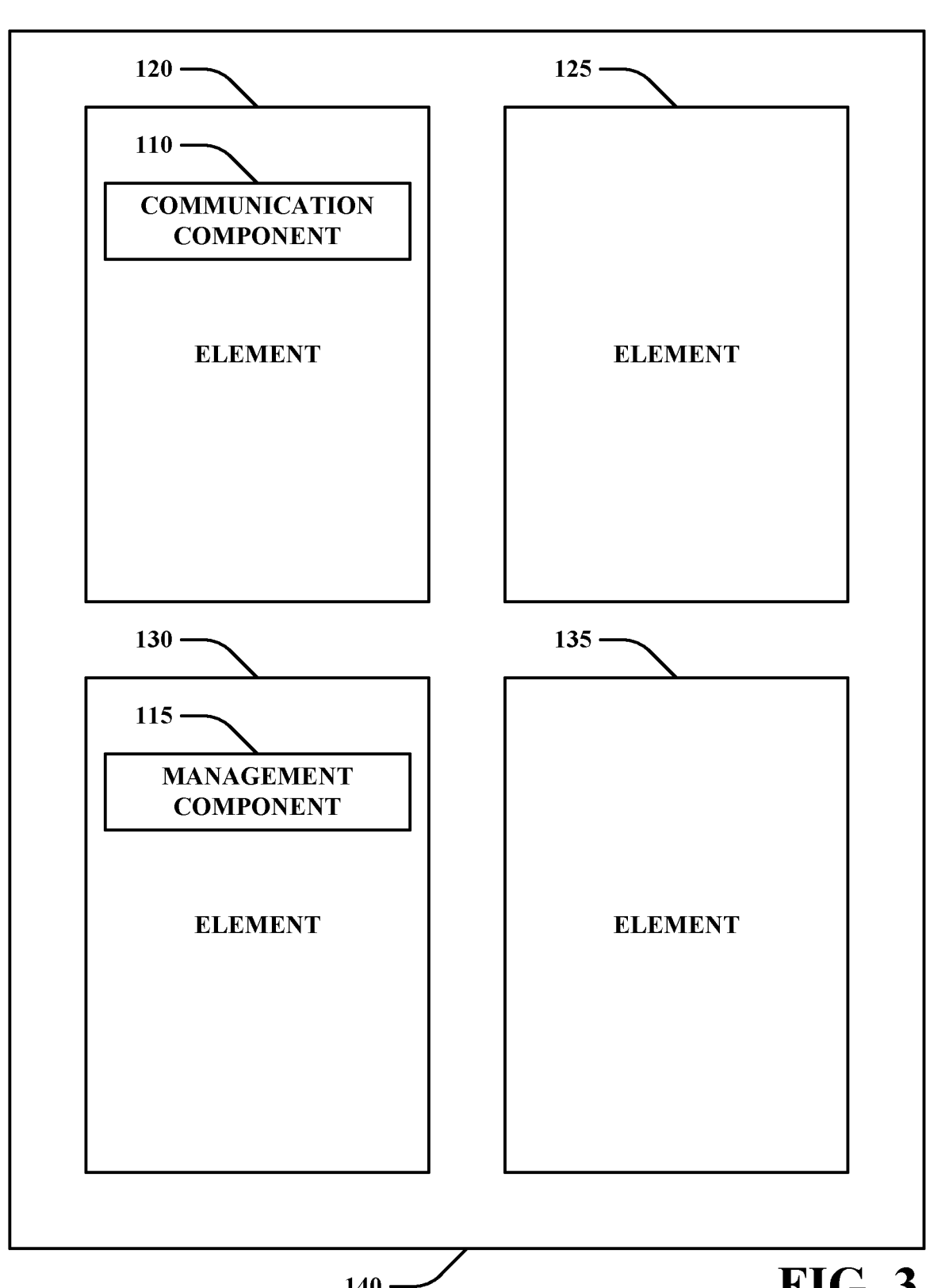
FIG. 3 illustrates one embodiment of the swarm with elements.

FIG. 3 illustrates one embodiment of the swarm 140 with elements 120, 125, 130, and 135. The communication component 110 of FIG. 1 and management component 115 of FIG. 1 can be distributed across at least two elements of the swarm 140. For example, the communication component 110 can be part of one element (e.g., element 120) and the management component 115 can be part of a different element (e.g., element 130). In this embodiment, the elements 120 and 130 can be considered part of the system 105 of FIG. 1 and/or the swarm 140 can be considered part of the system 105 of FIG. 1. In one embodiment, the communication component 110 can establish the communication link with the element 120 (e.g., the element the communication component 110 resides upon).

Figure 4:
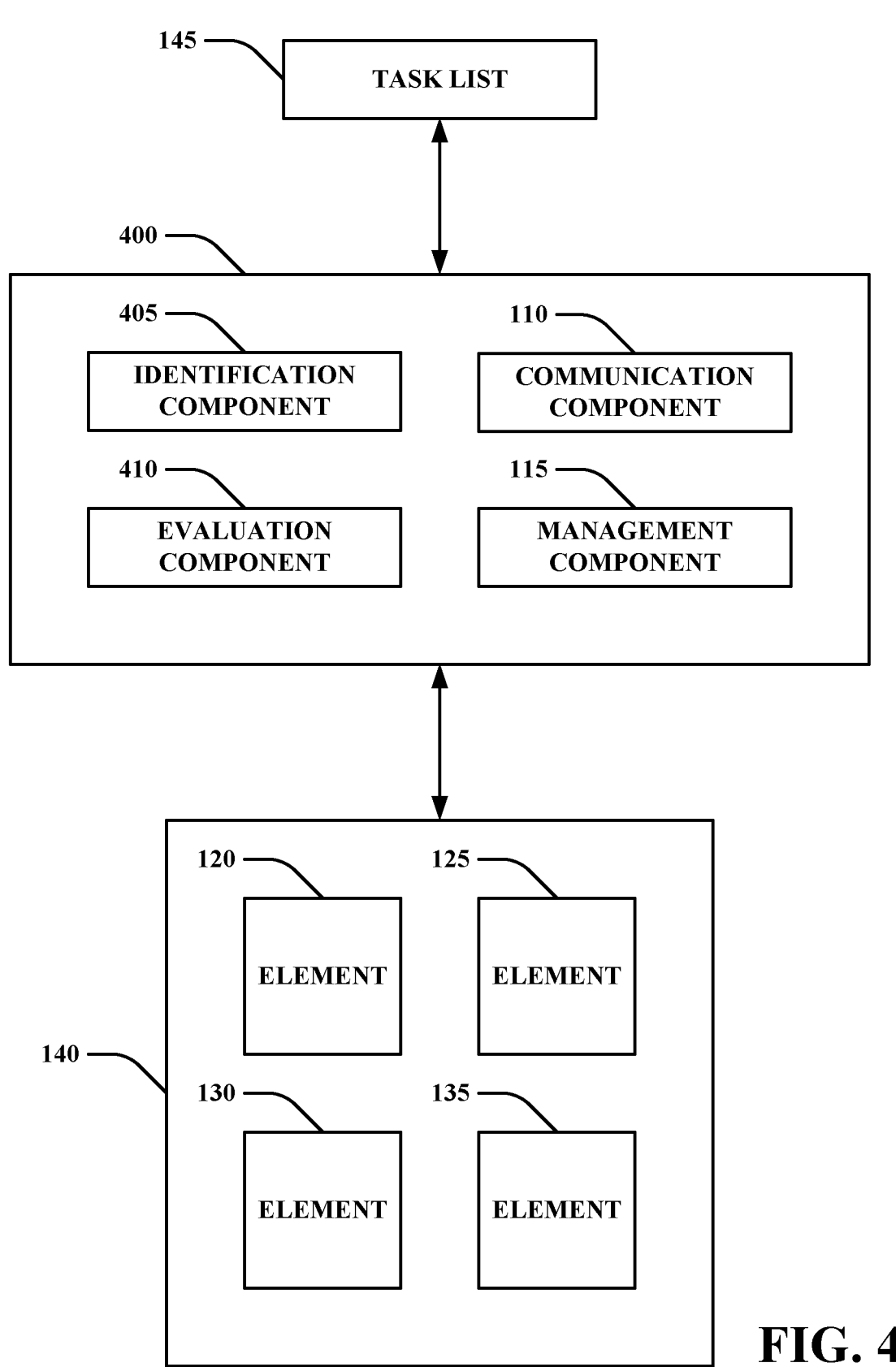
FIG. 4 illustrates one embodiment of a system with an identification component, an evaluation component, the communication component, and the management component.

FIG. 4 illustrates one embodiment of a system 400 with an identification component 405, an evaluation component 410, the communication component 110, and the management component 115. The identification component 405 can be configured to identify a change to the swarm 140, where the change includes a modification in swarm element number. For example, the swarm 140 could lose element 135 and thus be left with elements 120, 125, and 130 or gain one or more elements not pictured. Gained elements could include, but are not limited to, variants of elements 120, 125, 130, 135, or others. In another example, a part of an element can break (e.g., a cleaner can have two brushes and one breaks, rendering the cleaner less efficient, etc.) or otherwise become degraded or nonfunctional (e.g., out of cleaning solution, waste storage compartment full, mobility power source depleted, circuit damage, etc.). The evaluation component 410 can be configured to evaluate the swarm 140 with the change and the task list 145. The management component 115 can be configured to manage completion of the task list 145 by the swarm after the change.

For example, the four elements 120-135 can be vacuums cleaners. The elements can be identical (e.g., same model from same manufacturer) and include two brushes (e.g., a right and left). Elements can be assigned floor quarters to clean. For example, element 120 can be assigned to clean a northeast quarter of the floor. One of the two brushes can break on element 120. Before the break, the swarm 140 can be assigned to clean a floor and the management component 115 can assign quarters of the floor to specific elements (e.g., element 120 is assigned to clean the northwest corner). When the brush breaks on element 120, a communication can be sent to the system 400 (e.g., via the communication link) and the identification component 405 can identify the break and metadata associated with the break (e.g., when the break occurred, why the break occurred, if the element 120 attempted to compensate for the break, etc.) In addition, the identification component 405 can monitor operation of the swarm 140 after the break (e.g., identify how efficient the element 120 is cleaning with one brush) to produce an information set. The information set can include success information (e.g., how successful element 120 cleans with the broken brush), reason information (e.g., cause of the break of the brush on element 120), how other elements are performing their assigned tasks, etc. In at least one embodiment, the elements of a swarm do not have information relating to forensics describing a break, but are able to continue planning around the loss of an asset, even in lieu of further information.

At least part of the information set can be evaluated by the evaluation component 410. For example, the evaluation component 410 can evaluate the swarm 140 with the change (e.g., determine that the change is that element 120 lost a brush and that with one less brush it will take element 120 twice as long to clean the clean the northeast quarter). The evaluation component 410 can also evaluate the task list 145 (e.g., the task list 145 is that four quarters of the floor be cleaned). Based on evaluations from the evaluation component 410, the management component 115 can instruct the element 120 to clean part of the northeast quarter and instruct elements 125-135 to clean their assigned quarters and parts of the northeast quarter.

In one embodiment, the swarm 140 includes two elements and the task list 145 includes more than two tasks yet to be complete. When a swarm change occurs (e.g., an element being temporarily taken over by another swarm, an element being re-admitted into the swarm, etc.), tasks can be re-distributed to elements, one task can be assigned to multiple elements, a rotation plan cycling elements can be implemented, etc. In one embodiment, as the swarm 140 performs tasks from the task list 145, tasks can be completed and removed from the task list 145. Thus, contents of the task list 145 when a swarm is created may be different than when the change occurs.

Figure 5:
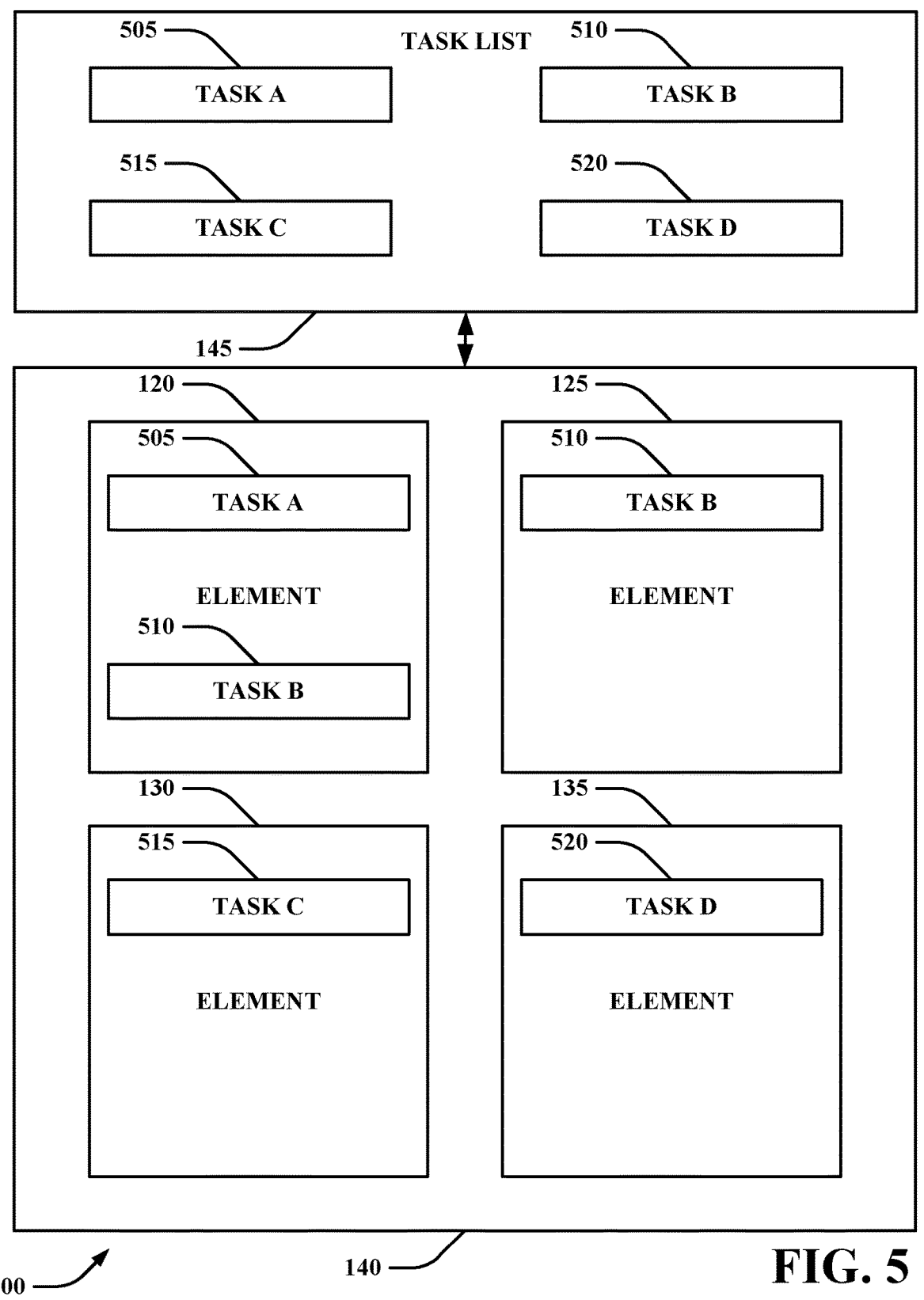
FIG. 5 illustrates one embodiment of an environment with the swarm and the task list.

FIG. 5 illustrates one embodiment of an environment 500 with the swarm 140 and the task list 145. The management component 115 of FIG. 4 can assign individual tasks from the task list 145 to individual elements (e.g., elements 120, 125, 130, and 135) of the swarm 140. For example, the evaluation component 410 of FIG. 4 can evaluate capabilities of elements 120, 125, 130, and 135 (e.g., capability information can be obtained by the identification component 405 of FIG. 4) as well as evaluate individual tasks of the task list 145 (e.g., task A 505, task B 510, task C 515, and task D 520). Based on a result of this evaluation, the management component 115 of FIG. 4 can determine which element should perform which task. In one embodiment, a task can be too difficult for one element to complete and the management component 115 of FIG. 4 can have two elements perform one task (e.g., element 120 and element 125 are assigned task B 510). In one embodiment, an element can be assigned multiple tasks and priority to a task (e.g., designation on which task should be performed first) can be assigned by the management component 115 of FIG. 4 (e.g., element 120 first performs task A 505, then when task A is finished element 120 assists element 125 in completing task B 510). In one embodiment, when an element completes a task, the management component 115 of FIG. 4 can assign the finished element another task (e.g., help an element with a task, assign a new task from the task list 145 that is yet to be assigned, etc.). In one embodiment, at least one task of the task list 145 can be a repetitive task (e.g., continuously clean a large floor until instructed to stop (e.g., in response to user instruction) or element is no longer able (e.g., taken by another swarm, loses battery power, etc.)).

In one embodiment, the task list 145 comprises a first task (e.g., task C 515) and a second task (e.g., task D 620). The management component 115 of FIG. 1 can be configured to assign a first swarm element (e.g., element 130) to complete the first task. The management component 115 of FIG. 1 can also be configured to assign a second swarm element (e.g., element 135) to complete the second task. In one embodiment, assigning a task to a first swarm element does not preclude the task from being assigned to another swarm element. In one embodiment, assigning the task to the first swarm element does not preclude the first swarm element from being assigned another task.

In an embodiment, the overall loading between elements can be arranged for improved (e.g., optimal) swarm productivity. For example, assignments can seek to equalize loadings between elements despite the presence of unequal tasks. In an embodiment, the elements can have tasks assigned in a way that minimizes time to completion, or seeks to have each element working for the same amount of time. In an embodiment, the elements can have tasks assigned in a way that attempts to equalize their overall productivity (e.g., in terms of dirt collected, surfaces painted, data sorted, pathogens destroyed, visual area rendered, rivets installed, routes planned, deliveries made, etc.). In one embodiment, tasks can be assigned to elements in accordance with elements' individual attributes (e.g., battery levels, amount of compartment filled, degraded capabilities, legacy models or outdated drivers/program, etc.). In one embodiment, the tasks can be assigned in a way that maximizes element lifespan by avoiding overheating, battery discharge, mechanical wear, etc. A wide assortment of other possible improvement schemes (e.g., optimization schemes), inhering a broad landscape of potential variables, will be cognizable by one of ordinary skill in the art upon reflection of the disclosures herein. In this regard, these descriptions are merely intended to portray some portion of the spirit of such task assignment schemes, and are in no way regarded as exhaustive.

Figure 6:
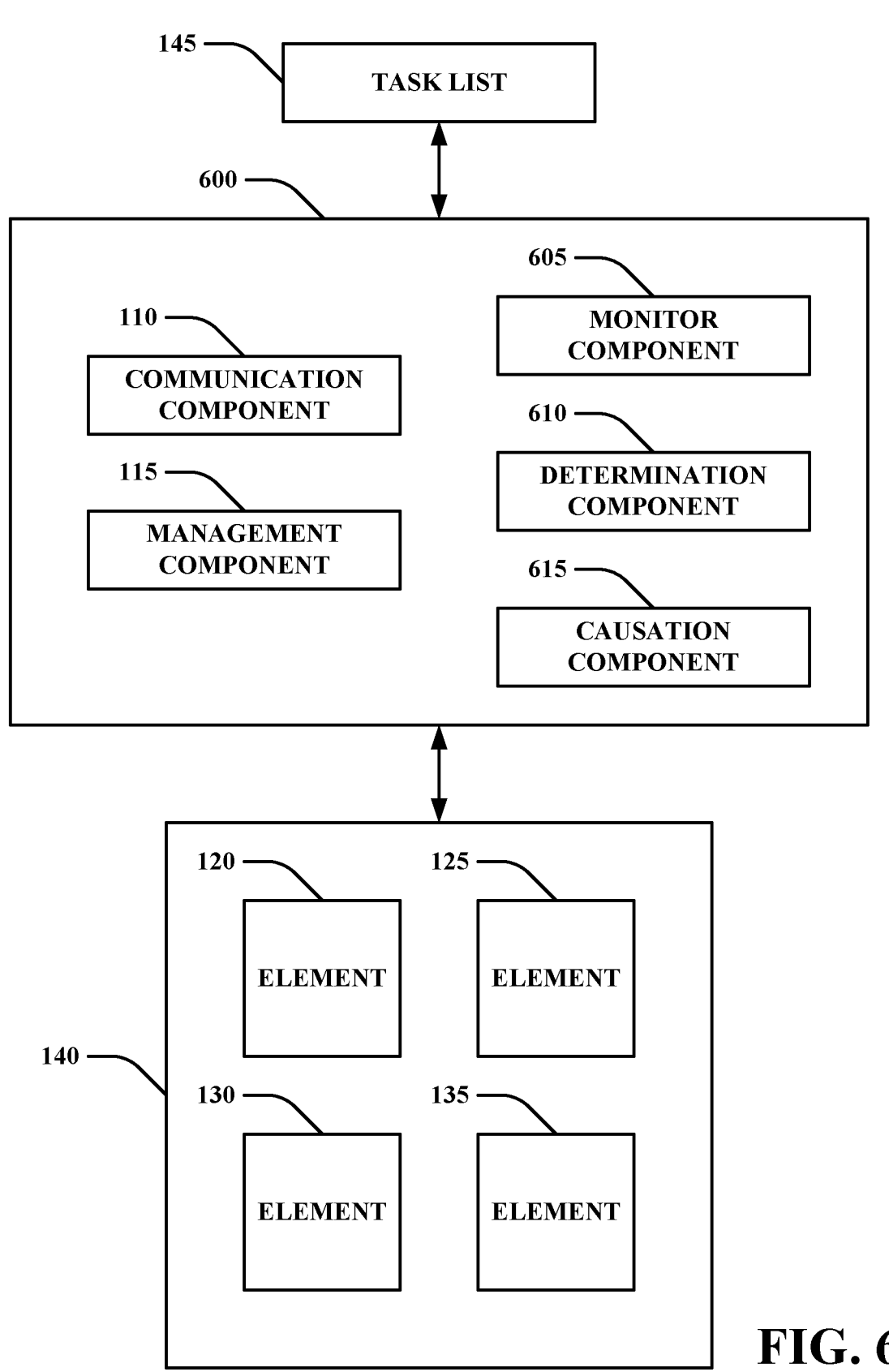
FIG. 6 illustrates one embodiment of a system with a monitor component, a determination component, and a causation component as well as the communication component and management component.

FIG. 6 illustrates one embodiment of a system 600 with a monitor component 605, a determination component 610, and a causation component 615 as well as the communication component 110 and management component 115. The monitor component 605 is configured to monitor behavior of the swarm 140 to produce a monitor result. The determination component 610 is configured to determine an alteration plan to change operation of the management component 115 based, at least in part, on the monitor result. The causation component 615 is configured to cause operation of the management component 115 to be changed according to the alteration plan.

In one example, the alteration plan can be specific for a swarm. For example, the management component 115 can instruct element 120 to clean a northeast corner of a carpeted floor. After sending the element 120 to the northeast corner, the communication with the element 120 is lost (e.g., a communication link between the system 600 and the element 120 is broken). In response to the loss of element 120, the management component 115 can send element 125 to clean the northeast corner and element 125 can be lost. As opposed to sending element 130 or 135 to the northeast corner in response to losing element 125, the system 600 can modify operation of the management component 115. The monitor component 605 can observe the element 120 and element 125 are lost when assigned to one location. The determination component 610 can make a determination that elements should no longer be sent to the northeast corner. For example, the determination component 610 can make an inference that a wall the system believes to be at the corner is not there and thus elements are going out of communication range. Due to this inference, the determination component 610 can determine that the management component 115 is to no longer send elements to the northeast corner. The causation component 615 can instruct the management component 115 to no longer send elements to the northeast corner. In one embodiment, the communication component 110 can send a message to a personal electronic device notifying of the lost elements, a message to a personal electronic device notifying of the change in the management component 115 (e.g., stemming from instruction of the causation component 615), a general distress message attempting to locate the lost elements, etc. In one embodiment, the element 130 can be sent to a last known position of the element 120 and/or element 125 to attempt to find the lost elements. In one embodiment, a lost element can be considered still part of the swarm 140 or no longer part of the swarm 140.

In one example, the system 600 can be used to reconnect a lost element (e.g., the element 120 when lost) with a swarm (e.g., the swarm 140). For example, when the element 120 is lost when going to the northeast corner, the system 600 resides upon the element 120. The monitor component 605 can observe communication (e.g., via the communication link) between the element 120 and other swarm elements and identify when communication is lost. The determination component 610 can access a memory of the system 600 to determine if the other elements of the swarm 140 include a communication component 110 and a management component 115. If the other elements do not, then the determination component 610 can determine that the element 120 should attempt to return to communication with the other elements (e.g., and disregard an assigned task). The determination component 610 can also determine a manner (e.g., a best manner) to reestablish communication with the other elements. For example, the determination component 610 can determine that the lost element 120 should return to a last known position of communication with the lost element 120. The causation component 615 can instruct the management component 115 to stop performing a task and instead to attempt to re-communicate with the other elements. In at least one embodiment, one or more of the components of system 600 can be embodied on one or more of elements 120, 125, 130 and 135, and these elements can actively maintain their own swarm connectivity, troubleshoot their conflicts with the swarm or individual elements thereof, etc.

Figure 7:
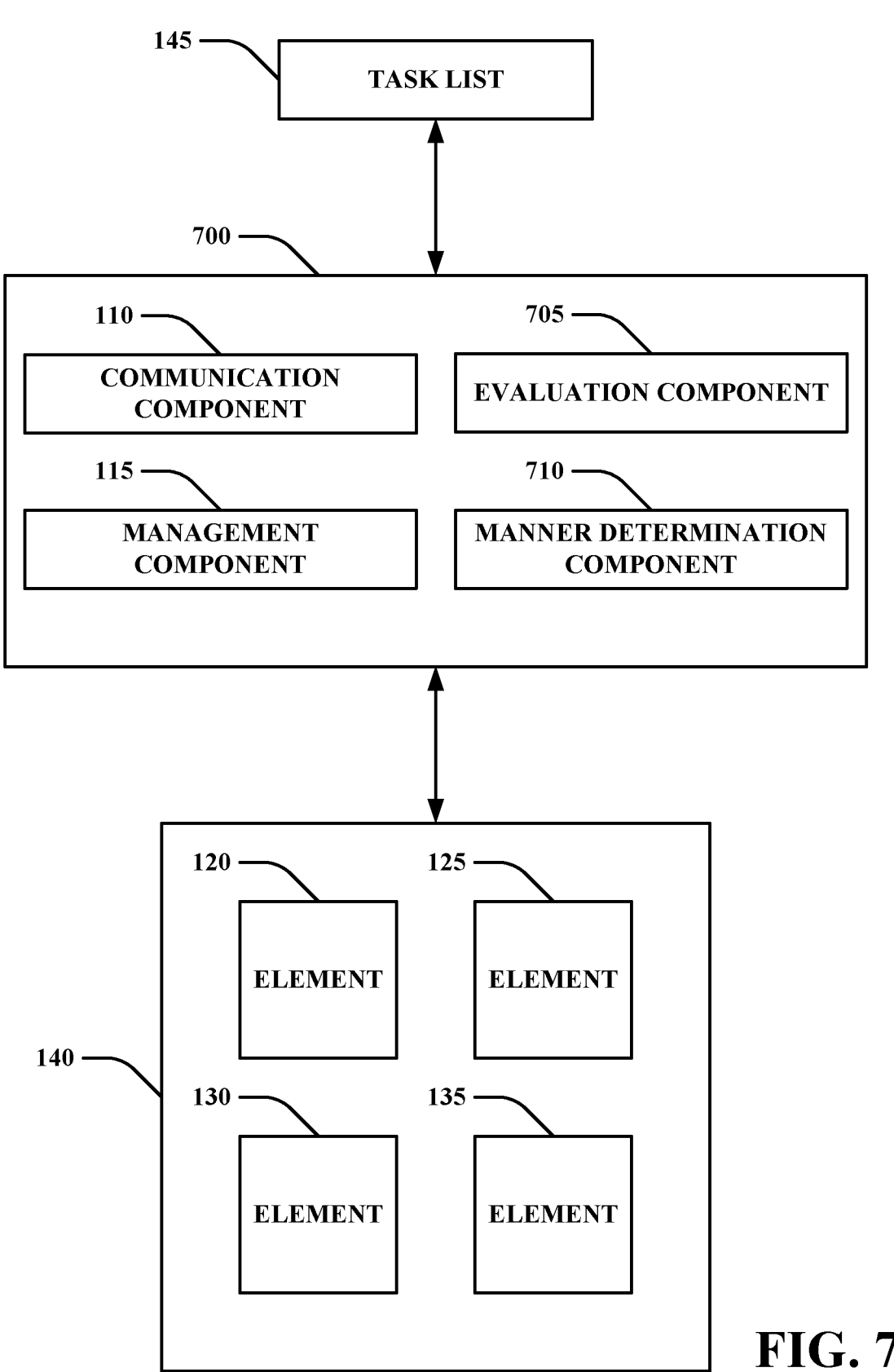
FIG. 7 illustrates one embodiment of a system with an evaluation component and a manner determination component along with the communication component and the management component.

FIG. 7 illustrates one embodiment of a system 700 with an evaluation component 705 and a manner determination component 710 along with the communication component 110 and the management component 115. The system 700 can have access to the task list 145 (e.g., a list of items to be performed by the swarm 140). The evaluation component 705 can be configured to evaluate the task list 145. This evaluation can include identifying what the tasks are (e.g., as well as subtasks thereof), if individual tasks should be performed in a certain order (e.g., dust first, then mop), if the swarm 140 includes appropriate elements to complete tasks (e.g., the task list 145 includes vacuuming, but elements 120, 125, 130, and 135 do not include vacuum capability), etc. In this regard, the manner determination component 710 can operate from an endstate perspective (e.g., a final goal of an element and/or task). In the example provided, this would be analogous to an endstate of "clean floor," where the manner determination component 710 recognizes—either through circuitry, software, previous instruction, learned behavior after seeking the desired endstate more than once, etc.—that steps such as sweeping, mopping, drying, buffing, etc., are to be performed in a particular order and according to particular constraints to reach the sought endstate. The manner determination component 710 can be configured to determine a manner for the task list 145 to be completed by at least one element of the swarm 140 (e.g., where the swarm includes one or more elements), where the management component 115 is configured to cause the swarm 140 to work toward completion of the task list 145 (e.g., complete the tasks of the task list 145, attempt to complete at least one task of the task list 145, etc.) in accordance with the manner.

In one embodiment, the task list 145 comprises at least two tasks (e.g., task A 505 of FIG. 5 and task B 510 of FIG. 5) and the swarm 140 comprises at least two elements (e.g., element 120 and element 125). The manner can comprise a designation of an element (e.g., element 140) of the swarm 140 to attempt completion of a task of the task list 145. For example, one or more elements of the swarm 140 can be assigned a specific task as well as an item not part of the swarm 140. The manner can also comprise an order for completion of the tasks (e.g., an instruction not to perform task B 510 of FIG. 5 until task A 505 of FIG. 5 is complete, until a set amount of time is reached, until an instruction is received to commence on task B 510 of FIG. 5, etc.).

In one embodiment, the task list 145 can be populated with individual tasks. This population can occur from user input or proactive (e.g., automatic) evaluation of a situation (e.g., determining the floor has not been cleaned in 'x' amount of time, determining the floor has 'y' level of dust, etc.). The task list 145 populated with items can be retained on a personal electronic device, memory of an element, etc. The communication component 110 can access the task list 145 and the evaluation component 705 can evaluate the tasks (e.g., what the task entails, priority of tasks, etc.), the elements 120-135 (e.g., capabilities of the elements 120-135, if the elements 120-135 are part of other swarms, etc.), the floor, etc. A result of this evaluation can be used by the manner determination component 710 to determine a manner (e.g., how the swarm 140 should perform tasks). This determination, and thus manner, can include what order to perform tasks, what time to perform tasks, which element should perform which task, etc. The management component 115 can cause the swarm to complete the task list 145 according to the manner.

In one embodiment, the manner determination component 710 can identify that the swarm 140 is incapable of performing a task of the task list 145. For example, the task list 145 can include a mopping task when the elements 120-135 do not include mopping capabilities. In response to this lack of element, the management component 115 can attempt to add a mopping element to the swarm 140 (e.g., search for a mopping element, request for a user to add a mopping element, etc.). If a mopping element is unable to be added, the management component 115 can alter the task list such that the mopping task is excluded (e.g., removed from the task list, ignored by the management component 115, etc.). If the mopping element is available, than the management component 115 can attempt to add or add the mopping element to the swarm 140.

The manner determination component 710, like other components in the system 700, can utilize system or dedicated memory (or memories/storage), processor resources, various inferential, decision making and improvement (e.g., optimization) algorithms including artificial intelligence, and employ input from various interfaces as well as external and internal sensors such as photosensors, audiosensors, environmental sensors (e.g., thermometer, barometer, chemical sensors, etc.), and others (e.g. voltmeter, tachometer, speedometer, accelerometer, electromyogram, rotational, gyroscopic, GPS, altimeter, infrared, strain, distance, etc.). These, as well as other resources inherent to these systems and components can be used to to provide the solutions detailed above.

Figure 8:
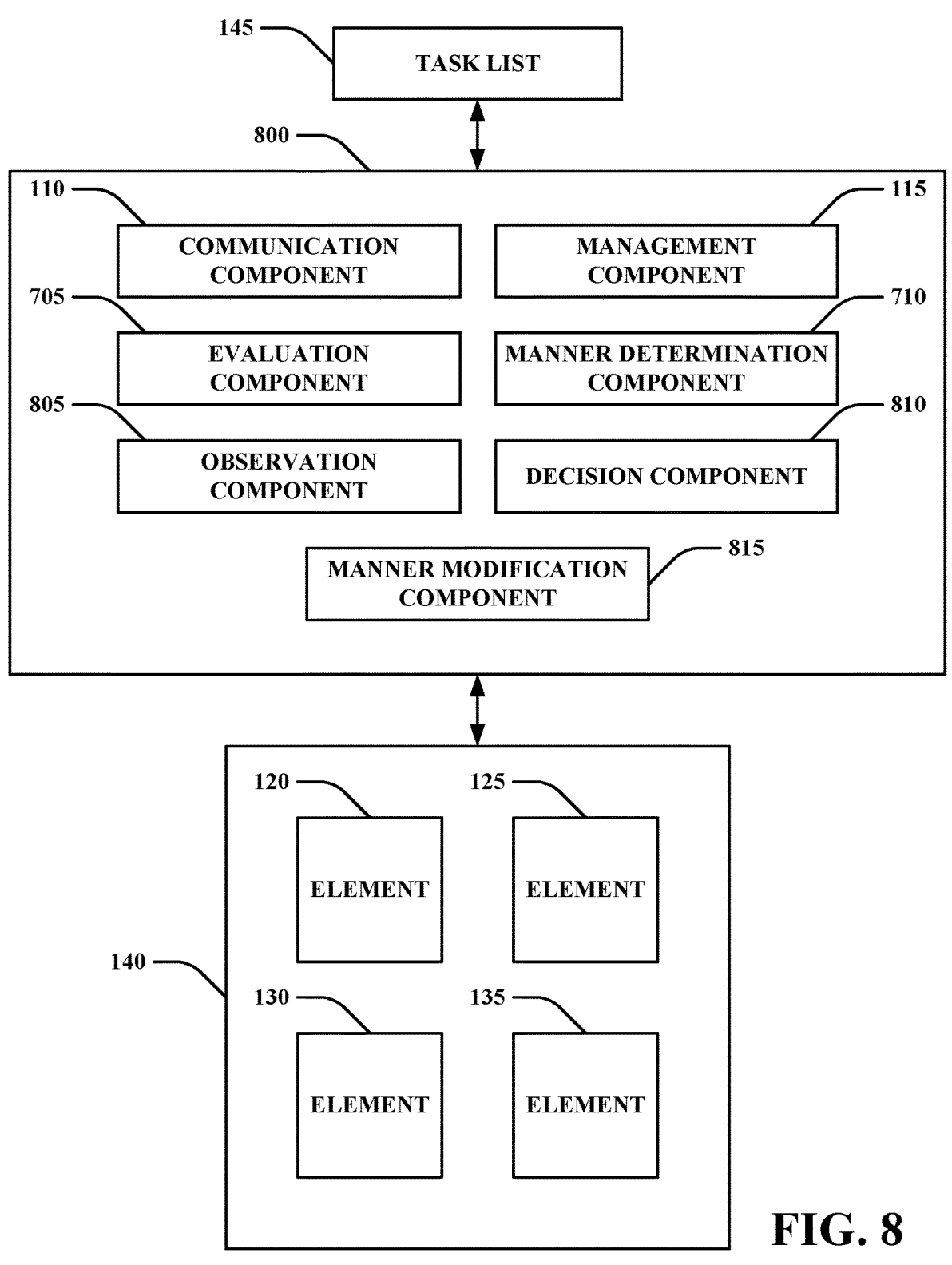
FIG. 8 illustrates one embodiment of a system with an observation component, a decision component, and a manner modification component along with the communication component, the management component, the evaluation component, and the manner determination component.

FIG. 8 illustrates one embodiment of a system 800 with an observation component 805, a decision component 810, and a manner modification component 815 along with the communication component 110, the management component 115, the evaluation component 705, and the manner determination component 710. The system 800 can derive a method for completing tasks based on a certain set of information. However, that certain set of information may be incomplete, out of date, etc. In addition, new information (e.g., not previously known information, updated information, etc.) can be learned from observing the swarm 140 and operation of the elements 120, 125, 130, and 135. Based on this new information, the manner can be modified to be more efficient (e.g., cause the elements to expend less energy, cause tasks to be performed quicker, etc.).

The observation component 805 can be configured to observe how the swarm 140 progresses along with performance of the task list 145 in accordance with the manner. This observation can occur while the swarm 140 progresses along with performance of the task list 145 in accordance with the manner. This observation can produce an observation result. The decision component 810 can be configured to decide if the manner should be modified based, at least in part, on the monitor result. The manner modification component 815 can be configured to modifying the manner in response to a determination being made that the manner should be modified.

In one example, the task list 145 can be to clean a floor and the manner determination component 710 can decide that an element should be assigned a quarter to clean (e.g., element 120 is assigned the northeast quarter and element 125 is assigned the northwest corner to clean). Once cleaning begins, the element 120 may be taking a relatively long time to clean the northeast quarter (e.g., due to an unexpected large amount of dust) and element 125 may be taking a relatively short time to clean the northwest corner (e.g., due to an unexpected small amount of dust). The observation component 805 can observe this occurrence and the decision component 810 can decide that a change in the manner should occur. For example, the decision component 810 can decide that part of the northeast quarter should be assigned from element 120 to element 125. The manner modification component 815 can alter the manner according to this decision and the management component 115 can cause the swarm to change behavior (e.g., cause the part of the northeast corner to switch from element 120 to element 125).

Figure 9:
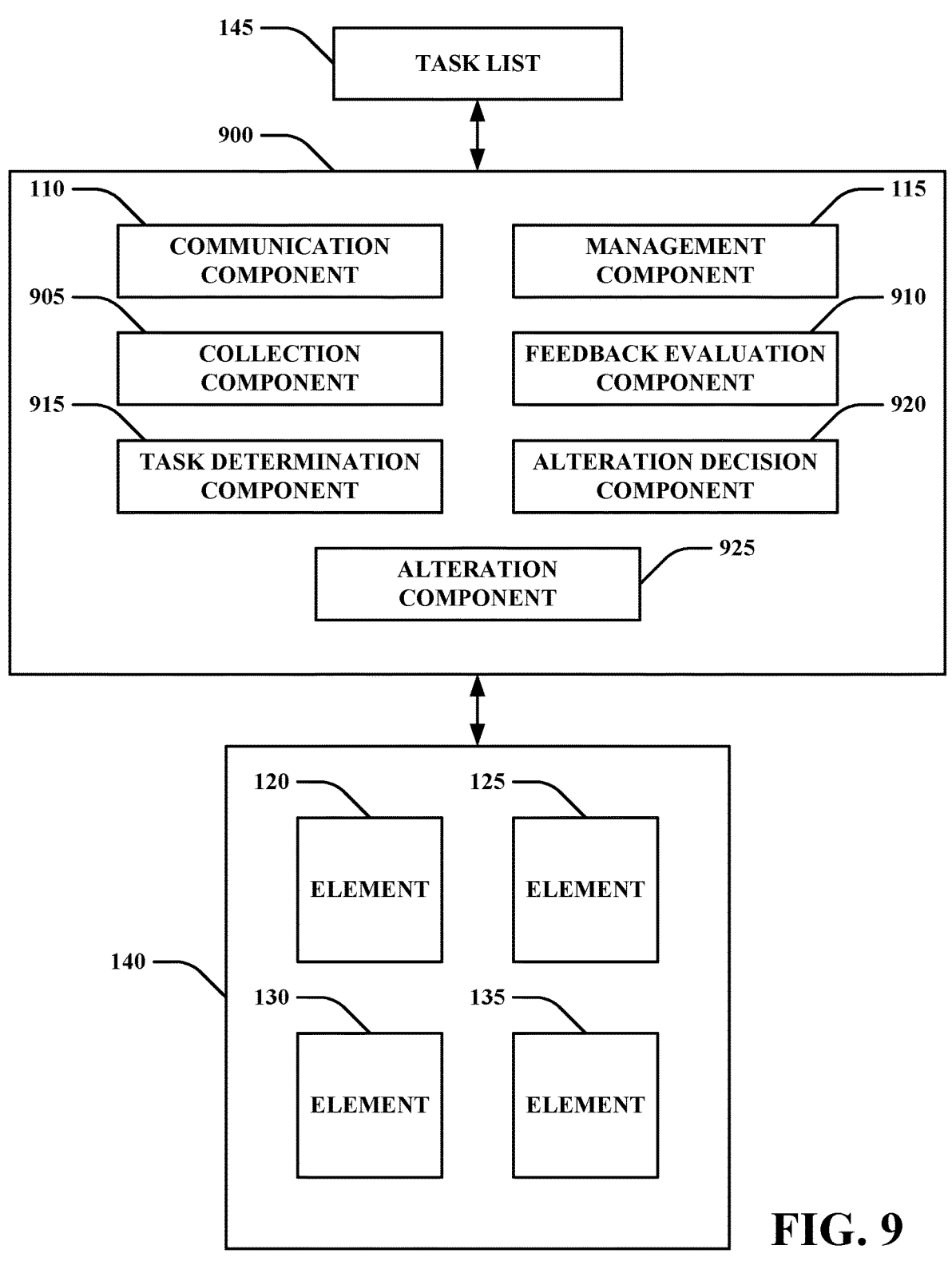
FIG. 9 illustrates one embodiment of a system with a collection component, a feedback evaluation component, a task determination component, an alteration decision component, and an alteration component in addition to the communication component and the management component.

FIG. 9 illustrates one embodiment of a system 900 with a collection component 905, a feedback evaluation component 910, a task determination component 915, an alteration decision component 920, and an alteration component 925 in addition to the communication component 110 and the management component 115. An element (e.g., element 120) can provide feedback to the system 900 and based on this feedback the system 900 can alter how the swarm 140 operates, how at least one other element (e.g., elements 125, 130, and 135) operates, how future swarms are organized or operated, etc.

The collection component 905 can be configured to collect a feedback from at least one element of the swarm 140, where the feedback relates to how the swarm 140 performs the task list 145 (e.g., attempts to complete at least one task of the task list 145). The feedback evaluation component 910 can be configured to evaluate the feedback to produce a feedback evaluation result. The task determination component 915 can be configured to determine if the task list 145 should be altered based, at least in part, on the feedback evaluation result. The alteration decision component 920 can be configured to decide how the task list should be altered based, at least in part, on the feedback evaluation result in response to a determination that the task list should be altered. The alteration component 925 can be configured to alter the task list 145 to produce an altered task list, where the management component 115 is configured to manage performance of the altered task list by the swarm 140 through the communication link.

In one embodiment, the system 900 can function to remove an individual task from the task list 145 once the individual task is completed by the swarm 140. The system 900 can actively monitor the swarm 140 (e.g., solicit information from the swarm 140) and/or the system 900 can passively monitor the swarm 140 (e.g., receive an unsolicited message from a swarm element). Through monitoring the swarm 140, the collection component 905 obtains feedback information related to the swarm 140 completing a task. This feedback information is evaluated by the feedback evaluation component 910 and based on this feedback evaluation, the task determination component 915 determines that the task is complete and should be removed from the task list 145. The alteration decision component 920 can verify that the task should be removed and that no other alteration is appropriate. The alteration component 925 can delete the task from the task list 145. In one embodiment, rather than removing a task completely, the task is shuffled to the end of the task list 145. In one embodiment, the task can be temporarily removed, or added to a different task list. As with other descriptions herein, these possible task list operations are not exhaustive, but merely describe simple, possible options cognizable under one or more embodiments herein.

In one embodiment, the system 900 can learn of new information and modify the task list 145 (e.g., add an individual task, modify an individual task, remove an individual task, etc.). For example, the element 120 can be assigned to clean a floor. Element 120 can be equipped with a brush. As element 120 cleans the floor, the element 120 can obtain information that its cleaning of the floor is inadequate. For example, the element 120 can identify that after brushing occurs, a relatively large amount of dirt remains on the floor. Information related to this identification can be obtained by the collection component 905. The feedback evaluation component 910 can evaluate this information, such as by performing analysis on why the relatively large amount of dirt remains. A result of this evaluation can be that the reason the relatively large amount of dirt remains is because the dirt is stuck to the floor and should be subjected to mopping. The task determination component 915 can determine that the amount of dirt remaining is substantial enough to warrant alteration of the task list 145. The alteration decision component 920 can decide that a mopping task should be added and the alteration component 925 can change the task list 145 to include a mopping task. In at least one embodiment, one or more tasks can be denoted as conditional, such that if a desired endstate can be accomplished without execution of the entire task list 145, they can be excluded; and if a desired endstate requires additional tasks, they can be included.

In one example, element 125 can be a mopping element and element 120 can be a vacuum element. Initially the task list 145 can include a task of 'clean the floor' and for efficiency reasons, the management component can instruct the element 120 to vacuum the floor without instructing the element 125 to mop. When it is determined that vacuuming is inadequately cleaning the floor, the task of 'clean the floor' can be split into two tasks: 'vacuum the floor' and 'mop the floor' by the system 900. With the task list 145 altered, the management component 115 can instruct the element 125 to mop the floor and the element 120 to vacuum the floor.

Figure 10:
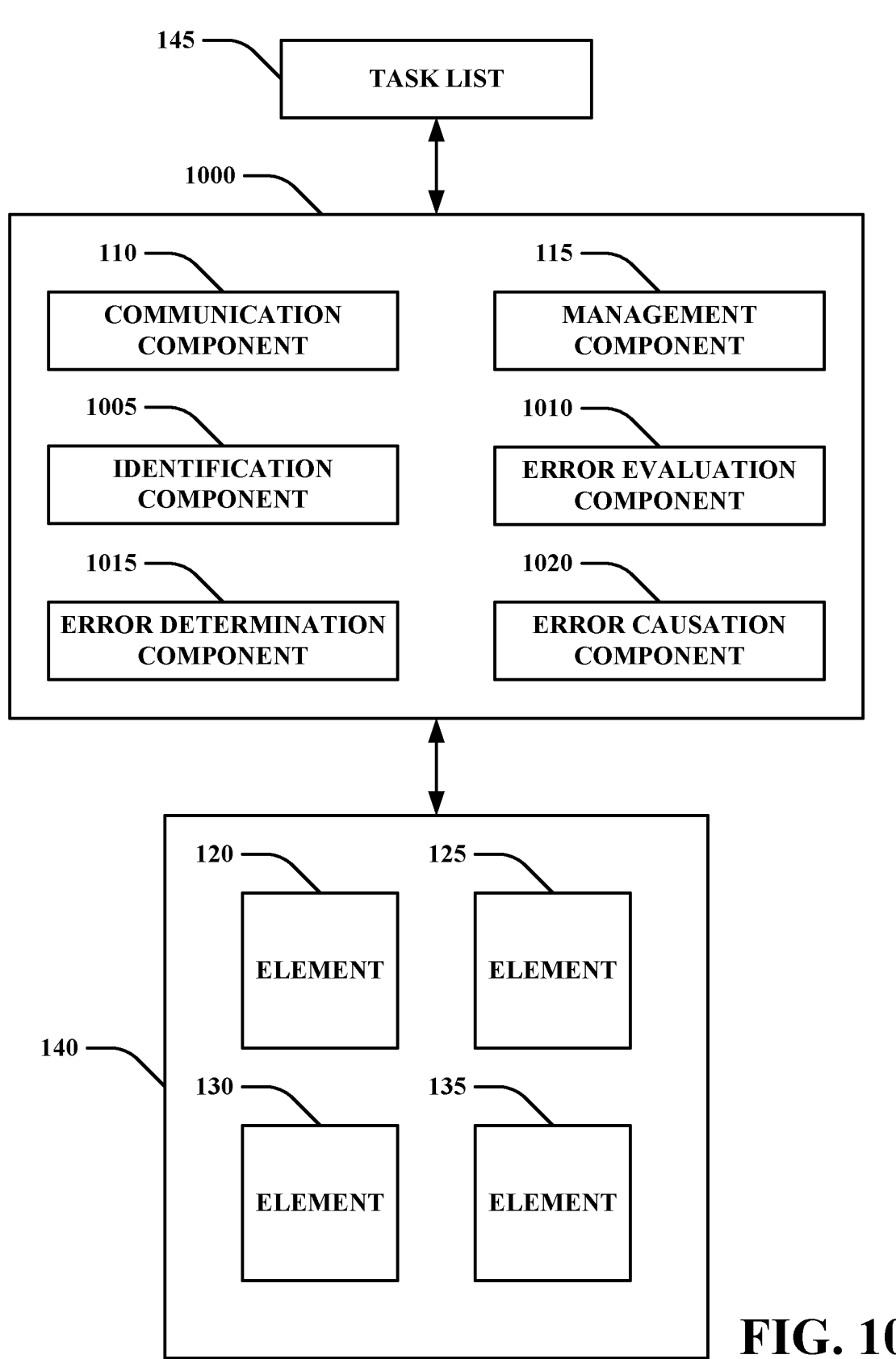
FIG. 10 illustrates one embodiment of a system with an identification component, an error evaluation component, an error determination component, and an error causation component as well as the communication component and the management component.

FIG. 10 illustrates one embodiment of a system 1000 with an identification component 1005, an error evaluation component 1010, an error determination component 1015, and an error causation component 1020 as well as the communication component 110 and the management component 115. The identification component 1005 can be configured to identify an error with the swarm 140. The error evaluation component 1010 can be configured to evaluate the error and the swarm 140 to produce an evaluation result. The error determination component 1015 can be configured to make a determination on how to correct the error based, at least in part, on the evaluation result. The error causation component 1020 can be configured to cause the error to be corrected according to the determination.

Various errors can occur with the swarm 140. For example, a swarm element can suffer a breakdown and the system 1000 can attempt to fix the swarm element (e.g., if a software error occurs, attempt to reboot a computer of the swarm element) or compensate for the breakdown (e.g., send other elements to perform tasks of the task list 145 assigned to the swarm element). In one example, an element (e.g., element 120, 125, 130, or 135) can become lost and the system 1000 can work to perform the task list 145 without the lost element and/or attempt to retrieve the lost element.

In one example, the task list 145 can include a task 'clean a floor' and the management component 115 can instruct element 120 to clean the northeast corner, element 125 to clean to the northwest corner, element 130 to clean the southeast corner and element 135 to clean the southwest corner. However, element 125 can accidently be instructed to clean the northeast corner. Thus, element 120 and element 125 clean the northeast corner while no element cleans the northwest corner. The identification component 1005 can identify this situation as an error and the error evaluation component 1010 can evaluate why this error occurs (e.g., to possibly modify the management component 115 to try to prevent the error from occurring in the future), what the error is, etc. The error determination component 1015 can determine that the instruction should be resent to element 125 to stop cleaning the northeast corner and start cleaning the northwest corner. The error causation component 1020 can instruct the management component 115 to resend the instruction to element 125.

Figure 11:
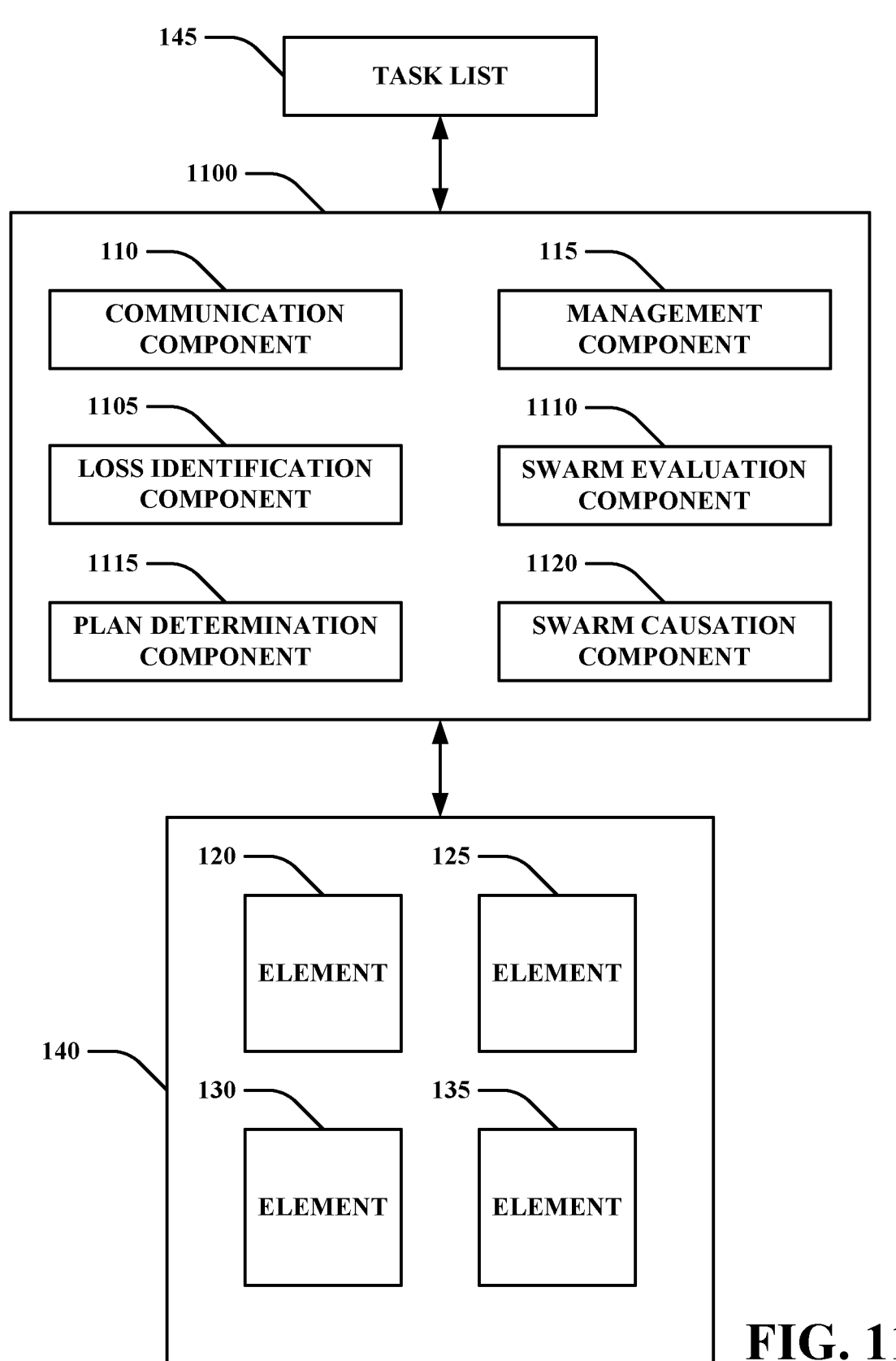
FIG. 11 illustrates one embodiment of a system with a loss identification component, a swarm evaluation component, a plan determination component, and a swarm causation component along with the communication component and the management component.

FIG. 11 illustrates one embodiment of a system 1100 with a loss identification component 1105, a swarm evaluation component 1110, a plan determination component 1115, and a swarm causation component 1120 along with the communication component 110 and the management component 115. The loss identification component 1105 can be configured to identify a loss of a lost element of the swarm 140. The swarm evaluation component 1110 can be configured to evaluate the swarm 140 and the task list 145 in response to identification of the loss to produce an evaluation result. The plan determination component 115 can be configured to determine a compensation plan for the loss based, at least in part, on the evaluation result. The swarm causation component 1120 can be configured to cause the swarm 140 to implement according to the compensation plan (e.g., through sending an instruction to the management component 115). In one embodiment the compensation plan comprises locating the lost element and re-integrating the lost element into the swarm once the lost element is found.

Returning the vacuum cleaning example, the loss can occur from stairs (e.g., a cleaner falling down stairs the cleaner did not know to avoid), an external factor (e.g., flipped over by a household dog or cat), electromagnetic interference, unknown hazard, an element going outside of communication range, loss of power by an element, an element receiving damaging computer code and the management component 115 breaking off communication with the element to prevent spreading of the code, etc. In one embodiment, the communication component 110 can send out signals directed to individual elements requesting a return message (e.g., sent out periodically, sent out randomly, etc.). When a message is not received, the loss identification component 1105 can classify the non-responding element as lost. It is to be appreciated that other loss identification methods can be employed. In one embodiment, the management component 115 can attempt to find the non-responding element. After the identified loss, the system 1100 can determine a projected impact of the loss and compensate for that projected impact by reshuffling task assignment, moving elements, etc.

Figure 12:
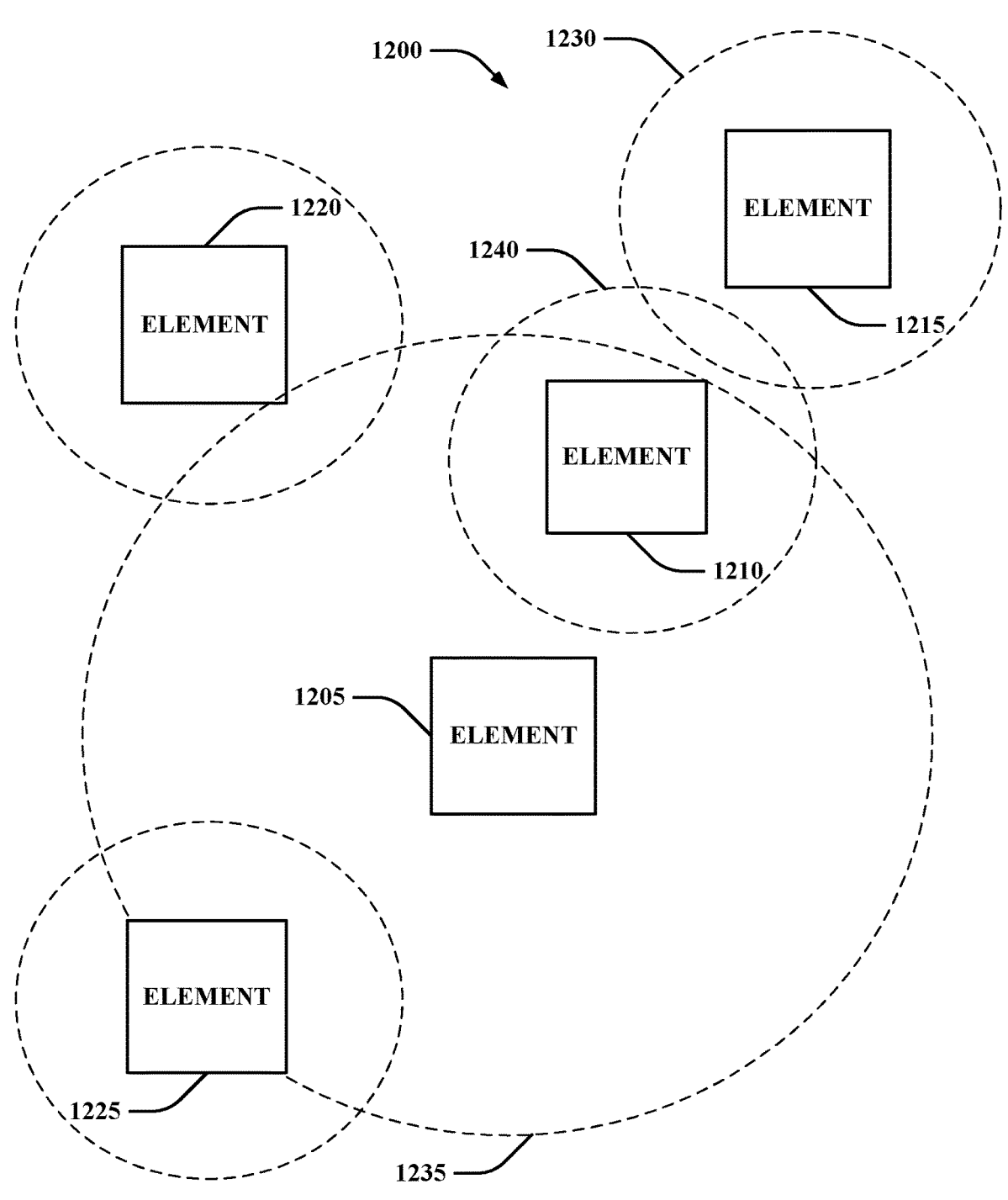
FIG. 12 illustrates one embodiment of a system with five elements.

FIG. 12 illustrates one embodiment of a system 1200 with five elements—1205, 1210, 1215, 1220, and 1225. While the system 1200 is shown with five elements, it is to be appreciated that a swarm can have fewer than five elements (e.g., two elements) as well as more than five elements (e.g., eight elements). In one embodiment, the system 1200 can be used to obtain a lost element. Elements 1205-1225 can be part of a swarm. The system 1100 of FIG. 11 can be used to re-integrate the lost element into the swarm. For example, the system 1100 of FIG. 11 can integrate upon the element 1205. Element 1215 can have a communication range 1230 that is outside of the communication range 1235 of element 1205. Since the communication ranges 1230 and 1235 do not overlap, element 1205 may not be able to communicate with element 1215 and thus element 1215 can be considered lost. Element 1210 can be sent by the management component 115 of FIG. 11 to find element 1215 and establish communication between element 1215 and element 1205. A communication range 1240 of element 1210 can be used to return element 1215. For example, element 1210 can position itself such that its communication range 1240 overlaps, at least in part, with the communication range 1230 of element 1215 and with the communication range 1235 of element 1205. When this double overlap occurs, the element 1210 can sent a message to element 1205 that element 1215 is located and/or instruct the element 1215 and/or element 1205 to stop movement. The management component 115 of FIG. 11 can sent a message instructing element 1215 to return to within the communication range 1235 of element 1205 (instruct element 1215 to move to a specific position). The message can be sent from element 1205 to element 1210 and then be relayed from element 1210 to element 1215. When out of communication range 1235 of element 1205 (or when out of communication range of any other swarm element), element 1215 can be considered still an element of the swarm or not an element of the swarm.

In one embodiment, the system 1200 can function as a swarm. The system 100 of FIG. 1 can integrate upon the element 1205. The management component 115 can extend an overall range of the swarm by having communication ranges overlap. For example, if elements 1205-1225 are vacuums, then the overall range of the swarm can be extended without moving element 1205 by positioning elements such as elements 1205, 1210, and 1215. Element 1215 can reach further areas than if its communication range 1230 at least partially overlapped communication range 1235.

Figure 13:
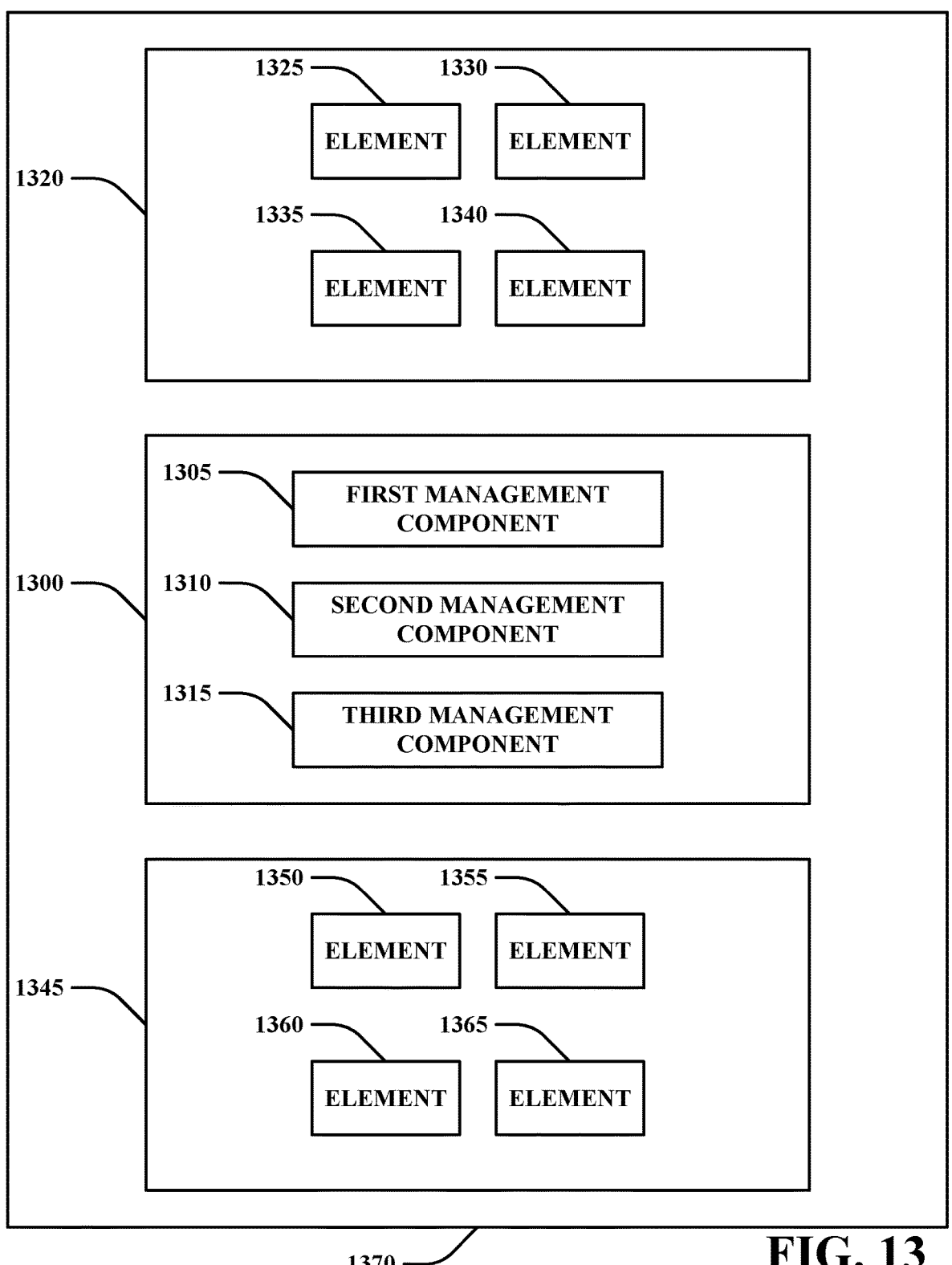
FIG. 13 illustrates one embodiment of a system with a first management component, a second management component, and a third management component.

FIG. 13 illustrates one embodiment of a system 1300 with a first management component 1305, a second management component 1310, and a third management component 1315. The system 1300 can be in communication with multiple swarms, such as swarms 1320, 1345, and 1370. In one embodiment, swarm 1370 is a first swarm, swarm 1320 is a second swarm, and swarm 1345 is a third swarm. While the system 1300 is shown as being encompassed in the third swarm 1370, the system 1300 can at least in part be separate from the swarm 1370.

In one example, the system 1300 can communicate with the second swarm 1320 (with elements 1325, 1330, 1335, and 1340) and can communicate with the third swarm 1345 (with elements 1350, 1355, 1360, and 1365). The first swarm 1370 can function with the second swarm 1320 and the third swarm 1345 functioning as elements of the first swarm 1370. Thus, a swarm can be an element of another swarm and can have other swarms as its elements.

The first management component 1305 can be configured to manage the second swarm 1320, the second swarm 1320 comprising a first element (e.g., element 1325) and a second element (e.g., element 1340) while the second management component 1310 can be configured to manage the third swarm 1345, the third swarm 1345 comprising a third element (e.g., element 1350) and a fourth element (e.g., 1365). The third management component 1315 can be configured to manage the first swarm 1370, the first swarm 1370 comprising the second swarm 1320 and the third swarm 1345.

While three management components are shown, the first management component 1305, second management component 1310, and third management component 1315 can integrate into one component (e.g., the management component 115 of FIG. 1). In addition, at least one management component of the system 1300 can integrate upon an element of a swarm and/or function as the management component 115 of FIG. 1. For example, the third management component 1315 can reside, at least in part, on element 1350. Thus, the component that manages the third swarm 1345 can reside on an element of the second swarm 1320 (or first swarm 1370).

In one embodiment, the third management component 1315 can manage disputes between other management components (e.g., the first management component 1310 and the second management component 1315). For example, the first management component 1305 and the second management component 1310 can both attempt to have dominion over element 1335 and the third management component 1315 decides which swarm uses element 1335 (e.g., uses element 1335 first). The third management component 1315 can manage transfer of elements from one swarm to another (e.g., transferring element 1350 from the third swarm 1345 to the second swarm 1320). For example, the second swarm 1320 can include vacuum elements and the third swarm 1345 can include mopping elements. The first management component 1305 can request for a mopping element to be added to the second swarm 1320 (e.g., from the third swarm 1345, a general request, etc.). The third management component 1315 can evaluate the request, evaluate importance of tasks performed by the swarm 1345 (e.g., tasks performed by mopping elements of the swarm 1345), evaluate importance of a task list associated with the second swarm 1320, etc. Based on a result of this evaluation, the third management component 1315 can decide if an element should be pulled from the third swarm 1345 and given to the second swarm 1320, if the second swarm 1320 and third swarm 1345 can both incorporate a mopping element (e.g., with a priority usage arrangement established by the third management component 1315), deny the request, etc.

In one embodiment, the third management component 1315 can have a task list and distribute tasks to the swarms and a swarm's respective management component (e.g., the first management component 1305 for the second swarm 1320) manages which element (e.g., 1325-1340) handles a task. In one embodiment, the third management component 1315 can assign a task directly to an element of a subswarm (e.g., element 1355 of the third swarm 1345).

In one embodiment, the third management component 1315 can evaluate a group of elements (e.g., elements 1325-1340 and 1350-1365). Based on a result of this evaluation, the third management component 1315 can distribute the elements to other management components (e.g., the first management component 1305 and the second management component 1310) for creation into swarms. Based on a result of this evaluation the third management component 1315 can create the second swarm 1320 and the third swarm 1345 and assign management of these swarms to the first management component 1305 and the second management component 1310 respectively.

Figure 14:
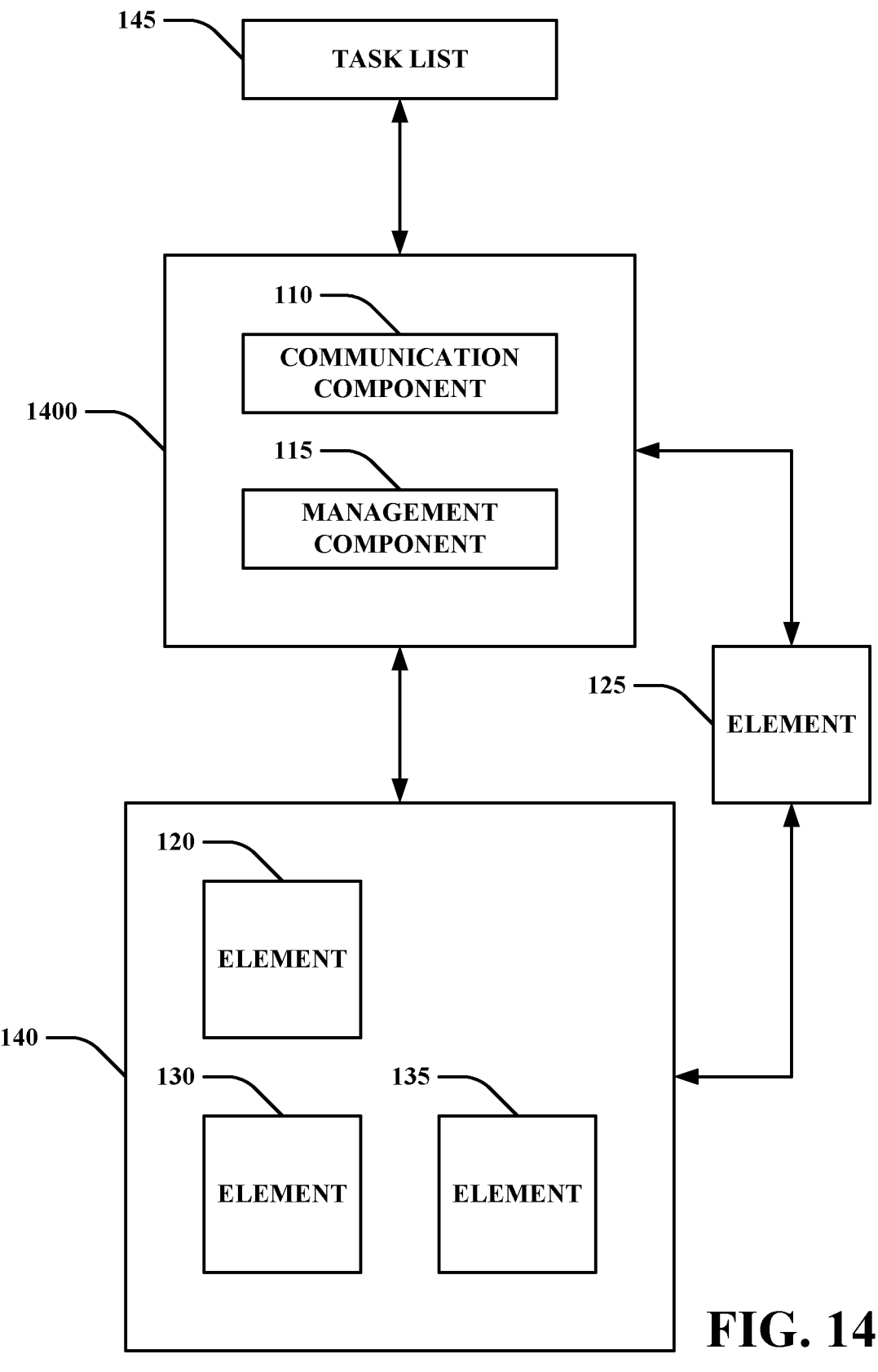
FIG. 14 illustrates one embodiment of a system with the communication component and the management component.

FIG. 14 illustrates one embodiment of a system 1400 with the communication component 110 and the management component 115. The communication component 110 can be configured to establish a communication link with an element 125 (or element 120, 130, or 135). In one embodiment, the communication component 110 can cause the communication link to be protected (e.g., information sent is encrypted, decryption keys and/or certificates are used, etc.). The management component 115 can be configured to cause the element 125 to become part of a swarm 140 through utilization of the communication link. The element 125 can be used in attempting to complete the task list 145 (e.g., once part of the swarm).

In one embodiment, the management component 115 is configured to create the swarm 140 with the element 125, where creation of the swarm 140 includes causing the element 125 to become part of the swarm 140. The management component 115 can evaluate the task list 145 and determine what elements should be used to complete the task list 145 in an efficient manner (e.g., optimally efficient manner). The management component 115 can locate these elements and organize these elements into a swarm. In one embodiment, the management component 115 clears rights for these elements (e.g., determines if the elements are part of another swarm, ensure elements can become part of a swarm, ensure element is authorized to become part of a swarm or another swarm, etc.).

In one embodiment, the management component 115 is configured to add the element 125 to the swarm 140 when the swarm 140 is an existing swarm. Adding the element to the swarm 140 can include notifying other elements of the addition, making aspects of the element 125 available to other elements and vice versa, etc.

In one embodiment, the swarm 140 is a first swarm. The element 125 can concurrently be part of the first swarm and a second swarm. For example, multiple swarms can share the element 125 (e.g., when the element 125 is an expensive element, when an element type of the element 125 is in short supply, when a swarm loses its own element that is of the element type, etc.). The management component 115 can manage the first swarm or the second swarm with or without causing the first swarm and second swarm to be organized as elements in a third swarm. In one embodiment, the management component 115 is configured to rectify a dispute that arises on use of the element 125 between the first swarm and the second swarm. The dispute can be rectified (e.g., resolved) by following an internal logic priority list, evaluating needs of different tasks and/or swarms and determining which swarm controls the element 125 based on a result of that evaluation, etc.

In one embodiment, the swarm 140 is a subsequent swarm. The management component 115 can be configured to remove the element 125 from a previous swarm and can be configured to cause the element 125 to become part of the subsequent swarm after removal from the previous swarm. In one example, an instruction to dismiss the element 125 from the previous swarm can be sent from the management component 115 to a management component of the previous swarm. The management component 115 can clear the element 125 of at least some data relating to the previous swarm and add data (e.g., priority instructions, firmware update, etc.) relating to the swarm 140. With the new metadata added, the element 125 can be added to the swarm 140.

In one embodiment, the element 125 is a first element. The communication component 110 and the management component 115 can be part of a second element (e.g., element 120) that is different from the first element. The management component 115 can be configured to cause the first element and second element to join together in a swarm (e.g., to form a new swarm, to add an element to an existing swarm, etc.). In one example, the element 120 can be part of the swarm 140 and the system 1400 resides on element 120. The management component 115 can cause the element 125 to join the swarm. In one example, the system 1400 can reside on the element 120 and the element may not be part of a swarm. The management component 115 can identify the element 125 as an element desirable to add to a swarm. The management component 115 can cause the element 120 and element 125 to join together into a swarm.

In one embodiment, when the element 125 leaves the swarm 140 (e.g., through instruction of another management component of another swarm) the management component 115 can remove sensitive information from the element 125. For example, proprietary computer code can be loaded onto the element 125 upon becoming part of the swarm 140. Upon leaving the swarm 140, the management component 115 can remove the proprietary code and/or upon entering the swarm, a program can be loaded that removes the proprietary code when the element 125 is no longer part of the swarm 140 (e.g., when the element 125 is removed from the swarm 140 to join another swarm, when the element 125 becomes lost and the proprietary code is re-loaded upon the element 125 re-integrating with the swarm 140, etc.).

In one embodiment, the system 1400 can be used to create a swarm (e.g., from basic components, such as from scratch). The management component 115 can identify elements, evaluate these elements, and determine that a swarm should be created. In response to this determination, the management component 115 can create the swarm. Swarm creation can be in response to explicit user instruction, a user instruction to complete a task list (e.g., the management component 115 determines that a swarm should be used to complete the task list), making a determination that a swarm should be created through use of at least one artificial intelligence technique, etc. Conversely, the system 1400 can be used to disband a swarm. The management component 115 can identify a swarm, evaluate the swarm, and determine if the swarm should be disbanded. In response to determining that the swarm should be disbanded, the management component 115 can disband the swarm. Swarm disbanding can be in response to explicit user instruction, identification that a task list is complete, making a determination that a swarm should be disbanded through use of at least one artificial intelligence technique, etc.

Figure 15:
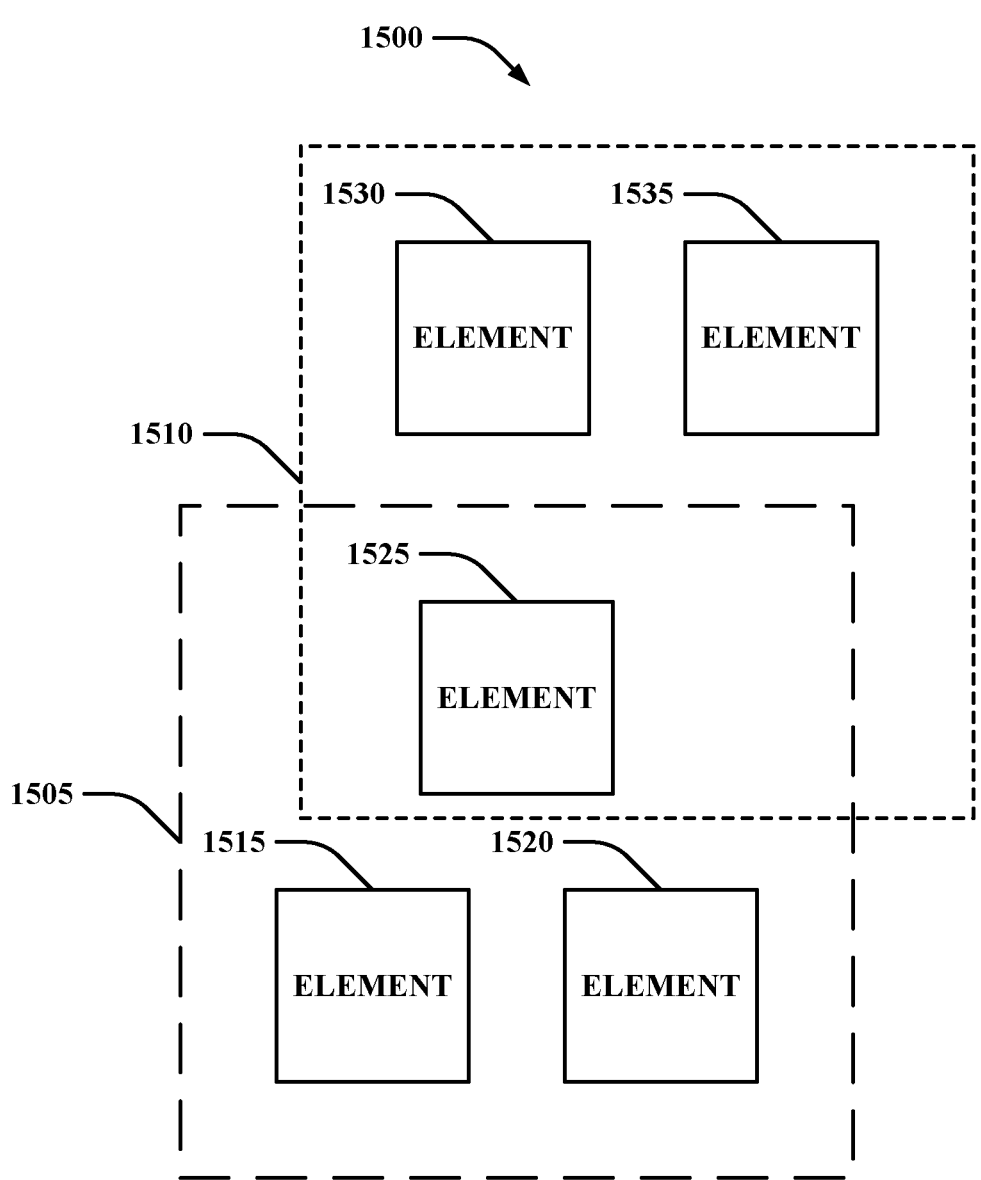
FIG. 15 illustrates one embodiment of an environment with a first swarm and a second swarm.

FIG. 15 illustrates one embodiment of an environment 1500 with a first swarm 1505 and a second swarm 1510. The first swarm 1505 can include element 1515, element 1520, and element 1525. The second swarm 1510 can include element 1525, element 1530, and element 1535. Thus, the first swarm 1505 and the second swarm 1510 share use of element 1525. In one embodiment, the management component 115 of FIG. 1 can be configured to manage use of the element 1525.

In one embodiment, the communication component 110 of FIG. 1 and the management component 115 of FIG. 1 can reside on the element 1525 and be configured to perform functionality with regard to the first swarm 1505 and the second swarm 1505 concurrently. In one example, the management component 115 of FIG. 1 can manage completion of a first task list by the first swarm 1505 and completion of a second task list by the second swarm 1510 (e.g., the first task list and the second task list are different and distinct task lists, the first task list and the second task list are sub-task lists of a master task list, etc.). In one embodiment, the communication component 110 of FIG. 1 and the management component 115 of FIG. 1 can reside on a non-shared element (e.g., element 1515, element 1530, etc.) or a non-element (e.g., a server).

In one embodiment, elements can be in a master-slave relationship. For example, the element 1525 can be a master element while element 1515, element 1520, element 1530, and element 1535 are slave elements.

The following methodologies are described with reference to figures depicting the methodologies as a series of blocks. These methodologies may be referred to as methods, processes, and others. While shown as a series of blocks, it is to be appreciated that the blocks can occur in different orders and/or concurrently with other blocks. Additionally, blocks may not be required to perform a methodology. For example, if an example methodology shows blocks 1, 2, 3, and 4, it may be possible for the methodology to function with blocks 1-2-4, 1-2, 3-1-4, 2, 1-2-3-4, and others. Blocks may be wholly omitted, re-ordered, repeated or appear in combinations not depicted. Individual blocks or groups of blocks may additionally be combined or separated into multiple components. Furthermore, additional and/or alternative methodologies can employ additional, not illustrated blocks, or supplemental blocks not pictured can be employed in some models or diagrams without deviating from the spirit of the features. In addition, at least a portion of the methodologies described herein may be practiced on a computer-readable medium storing computer-executable instructions that when executed by a computer cause the computer to perform a methodology.

Figure 16:
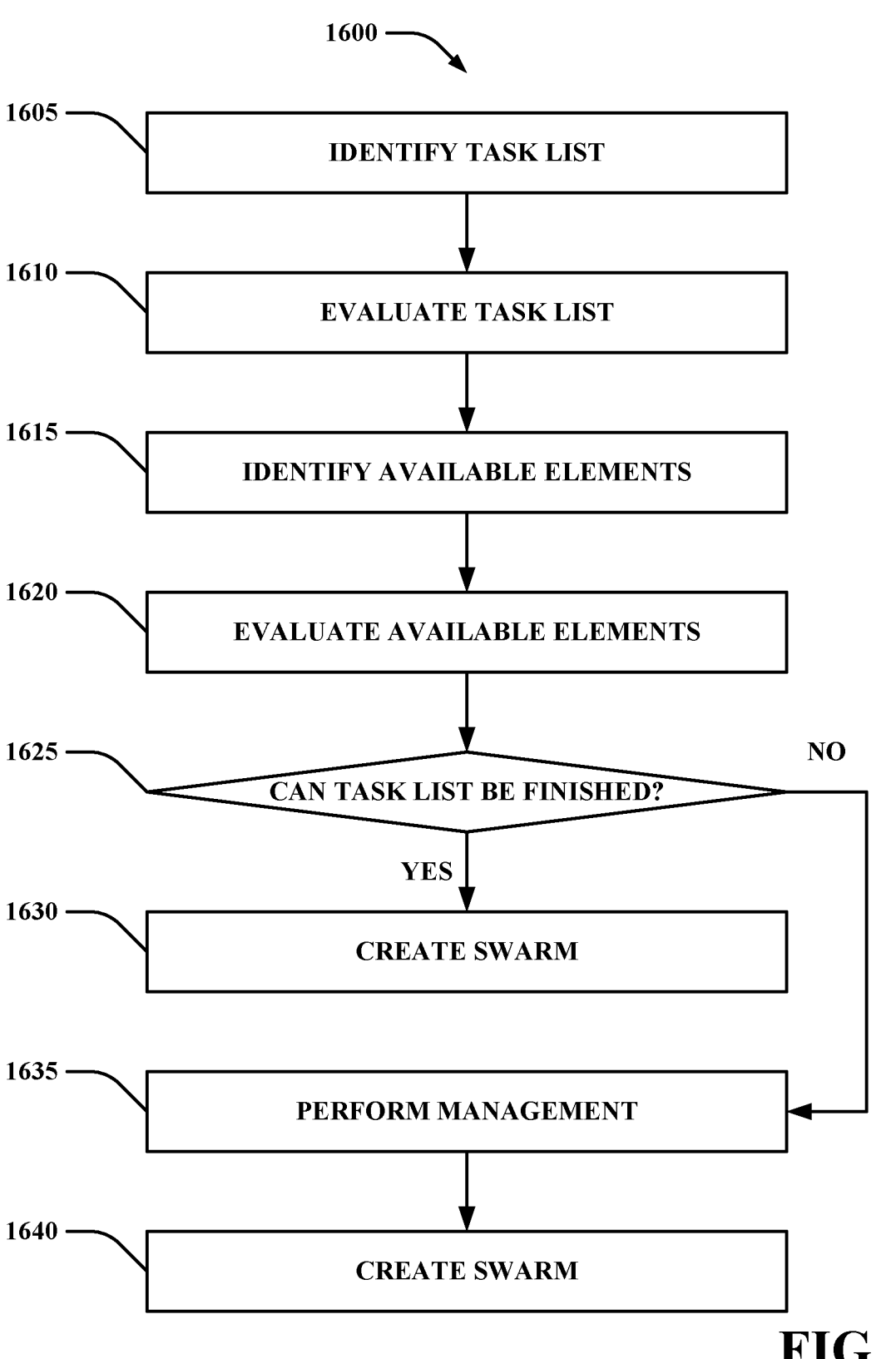
FIG. 16 illustrates one embodiment of a method that includes creating a swarm.

FIG. 16 illustrates one embodiment of a method 1600 that includes creating a swarm. At 1605, a task list can be identified and at 1610 the task list can be evaluated. Elements available can be identified at 1615 and evaluated at 1620. Although at least one embodiment can utilize entirely common elements, in at least one embodiment, these elements need not be identical in composition, disposition, or capabilities. At 1625, a determination can be made on if the task list can be finished by the available elements. For example, a comparison can be made between the items of the task list and capabilities of the elements. If the task list can be finished, then at 1630 a swarm is created. This swarm can be used to attempt to complete the task list. If the determination is that the task list cannot be finished by the available elements (e.g., elements are already used by another swarm, element do not have appropriate capabilities, etc.), then at 1635 management can occur on how to create a swarm that completes the task list as well as possible and then this swarm can be created at 1640.

Figure 17:
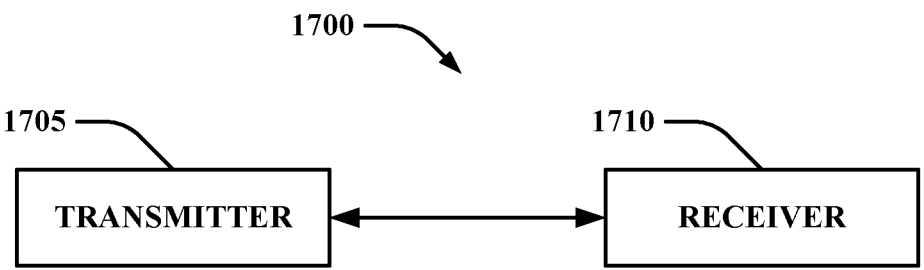
FIG. 17 illustrates one embodiment of a system that may be used in practicing at least one aspect disclosed herein.

FIG. 17 illustrates one embodiment of a system 1700 that may be used in practicing at least one aspect disclosed herein. The system 1700 includes a transmitter 1705 and a receiver 1710. In one or more embodiments, the transmitter 1705 can include reception capabilities and/or the receiver 1710 can include transmission capabilities. In one embodiment, the system 100 of FIG. 1 includes the transmitter 1705 and/or the receiver 1710. In one example, the transmitter 1705 and receiver 1710 integrate with and/or functions as the communication component 110 of FIG. 1.

The transmitter 1705 and receiver 1710 can each function as a client, a server, and others. The transmitter 1705 and receiver 1710 can each include a computer-readable medium used in operation. The computer-readable medium may include instructions that are executed by the transmitter 1705 or receiver 1710 to cause the transmitter 1705 or receiver to perform a method. The transmitter 1705 and receiver 1710 can engage in a communication with one another. This communication can over a communication medium. Example communication mediums include an intranet, an extranet, the Internet, a secured communication channel, an unsecure communication channel, radio airwaves, a hardwired channel, a wireless channel, and others. Example transmitters 1705 include a base station, a personal computer, a cellular telephone, a personal digital assistant, and others. Example receivers 1710 include a base station, a cellular telephone, personal computer, personal digital assistant, and others. The example system 1700 may function along a Local Access Network (LAN), Wide Area Network (WAN), and others. The aspects described are merely an example of network structures and intended to generally describe, rather than limit, network and/or remote applications of features described herein.

Figure 18:
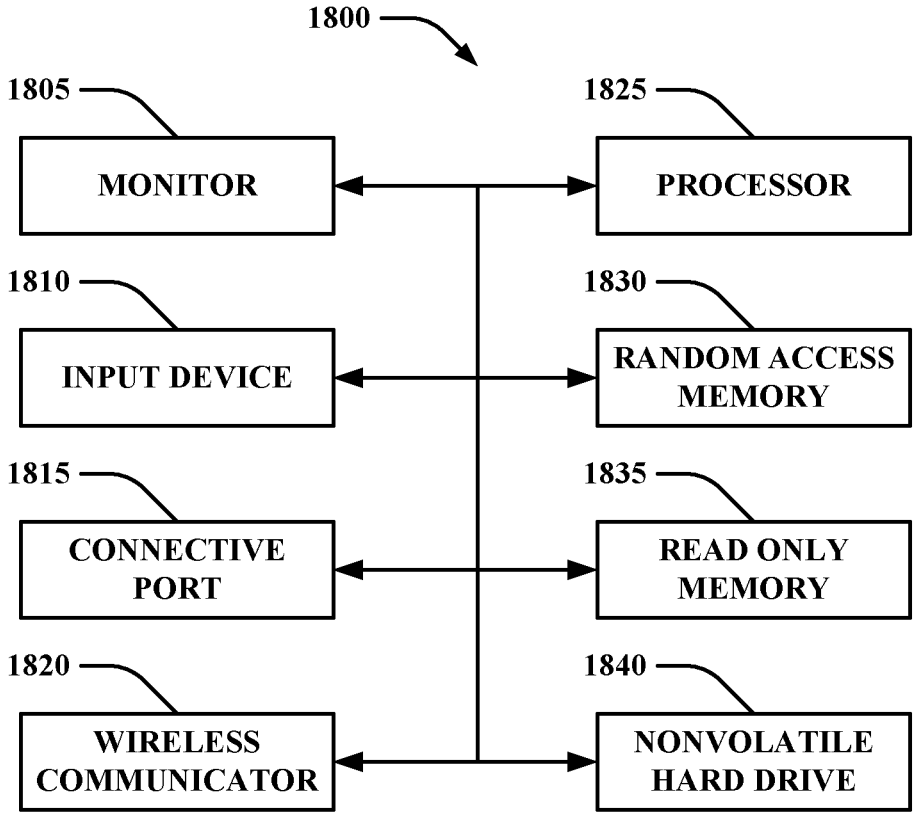
FIG. 18 illustrates one embodiment of a system, upon which at least one aspect disclosed herein can be practiced.

FIG. 18 illustrates one embodiment of a system 1800, upon which at least one aspect disclosed herein can be practiced. In one embodiment, the system 1800 can be considered a computer system that can function in a stand-alone manner as well as communicate with other devices (e.g., a central server, communicate with devices through data network (e.g., Internet) communication, etc). Information can be displayed through use of a monitor 1805 and a user can provide information through an input device 1810 (e.g., keyboard, mouse, touch screen, etc.). For example, the input device 1810 can be used to create the task list 145 of FIG. 1. A connective port 1815 can be used to engage the system 1800 with other entities, such as a universal bus port, telephone line, attachment for external hard drive, and the like. Additionally, a wireless communicator 1820 can be employed (e.g., that uses an antenna) to wirelessly engage the system 1800 with another device (e.g., in a secure manner with encryption, over open airwaves, and others). The wireless communicator can include the transmitter 1705 of FIG. 1700 and/or the receiver 1710 of FIG. 17. A processor 1825 can be used to execute applications and instructions that relate to the system 1800. In one example, the processor 1825 executes at least one instruction associated with at least one of the communication component 105 of FIG. 1 or the management component 115 of FIG. 1.

Storage can be used by the system 1800, such as to retain the task list 145 of FIG. 1. The storage can be a form of a computer-readable medium. Example storage includes random access memory 1830, read only memory 1835, or nonvolatile hard drive 1840. In one embodiment, a memory (e.g., at least one of the random access memory 1830, read only memory 1835, and/or the nonvolatile hard drive 1840) retains instructions that cause a method disclosed herein to operate. In one embodiment, the memory retains a database in accordance with at least one aspect disclosed herein.

The system 1800 may run program modules. Program modules can include routines, programs, components, data structures, logic, etc., that perform particular tasks or implement particular abstract data types. The system 1800 can function as a single-processor or multiprocessor computer system, minicomputer, mainframe computer, laptop computer, desktop computer, hand-held computing devices, microprocessor-based or programmable consumer electronics, and the like.

It is to be appreciated that aspects disclosed herein can be practiced through use of artificial intelligence techniques. In one example, a determination or inference described herein can, in one embodiment, be made through use of a Bayesian model, Markov model, statistical projection, neural networks, classifiers (e.g., linear, non-linear, etc.), using provers to analyze logical relationships, rule-based systems, or other technique.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, innovative aspects are not limited to the specific details, the representative apparatus, and illustrative examples shown and described. Thus, this application is intended to embrace alterations, modifications, and variations that fall within the scope of the appended claims.

Functionality described as being performed by one entity (e.g., component, hardware item, and others) may be performed by other entities, and individual aspects can be performed by a plurality of entities simultaneously or otherwise. For example, functionality may be described as being performed by a processor. One skilled in the art will appreciate that this functionality can be performed by different processor types (e.g., a single-core processor, quad-core processor, etc.), different processor quantities (e.g., one processor, two processors, etc.), a processor with other entities (e.g., a processor and storage), a non-processor entity (e.g., mechanical device), and others.

In addition, unless otherwise stated, functionality described as a system may function as part of a method, an apparatus, a method executed by a computer-readable medium, and other embodiments may be implemented in other embodiments. In one example, functionality included in a system may also be part of a method, apparatus, and others.

Where possible, example items may be combined in at least some embodiments. In one example, example items include A, B, C, and others. Thus, possible combinations include A, AB, AC, ABC, AAACCCC, AB, ABCD, and others. Other combinations and permutations are considered in this way, to include a potentially endless number of items or duplicates thereof.

What is claimed is:

1. A system comprising:
   a communication component that establishes a communication link with a swarm, which comprises a first swarm element with a first hardware storage and a second swarm element with a second hardware storage, and a third party element not part of the swarm, wherein the communication component is distributed in a partially redundant manner across elements of the swarm as a plurality of communication parts; where individual parts of the plurality of communication parts comprise parts for establishing the communication link and parts for protecting the communication link and sending at least one message to other elements of the swarm; and
   a management component that manages performance of a task list by the swarm through utilization of the communication link and that manages performance of the task list by the swarm in a decentralized manner,
   where the task list comprises at least one task capable of being performed, at least in part, by the swarm,
   where management of the performance of the task list in a decentralized manner includes at least performance on an element-level, and
   where management of performance occurs independent of a central entity that exercises control over the first element and the second element with regard to performance of the task list.

2. The system of claim 1,
   where the task list comprises at least two tasks capable of being performed, at least in part, by the swarm,
   where the management component creates a prioritization for the individual tasks of the task list, and
   where the management component manages performance of the task list by the swarm in accordance with the prioritization.

3. The system of claim 1,
   where the swarm and the third party element are remote from one another such that the communication link is an Internet communication link.

4. The system of claim 1,
   where the swarm receives an information set from the third party element by way of the communication link, and wherein the management component conditions performance of at least a portion of the task list upon receipt of the information.

5. The system of claim 1,
   where the swarm receives an information set from the third party element by way of the communication link and
   where the swarm performs at least part of the task list in response to the information set,
   where the information set comprises information on if a requirement is met, wherein the requirement includes at least one of a cost-based information, a time-based information, an efficiency-based information, a temperature-based information and a compensation-based information.

6. The system of claim 1,
   where the communication link is between at least the first element and the second element.

7. The system of claim 1,
   where the first swarm element functions, at least in part, as a first database and the second swarm element functions, at least in part, as a second database, and a swarm candidate;

an identification component configured to perform a security check on the swarm candidate to verify that the swarm candidate is verified to become part of the swarm; and where the management component is configured to cause the swarm candidate to become part of the swarm when the security check indicates that swarm candidate is verified and cause the swarm candidate to be rejected in becoming part of the swarm when the security check indicates that the swarm candidate is not verified, where the first element and the swarm candidate operate in a decentralized manner when the swarm candidate becomes part of the swarm, and where the second element and the swarm candidate operate in a decentralized manner when the swarm candidate becomes part of the swarm.

8. The system of claim 1,
where the communication component is disposed, at least in part, on the first element and
where the management component is disposed, at least in part, on the first element.

9. The system of claim 1,
where the third party element operates in a decentralized manner.

10. The system of claim 1,
where the swarm is a first swarm and
where the third party element is part of a second swarm.

11. The system of claim 10,
where the first swarm and second swarm do not share an element.

12. The system of claim 1,
where the first swarm element is a first block and
where the second swarm element is a second block.

13. A system comprising:
a communication component that establishes a communication link with a swarm, which comprises a first swarm element with a first hardware storage and a second swarm element with a second hardware storage, and a third party element not part of the swarm, wherein the communication component is distributed in a partially redundant manner across elements of the swarm as a plurality of communication parts;
where individual parts of the plurality of communication parts comprise parts for establishing the communication link and parts for protecting the communication link and sending at least one message to other elements of the swarm; and
a management component that manages collection of an information set for the swarm from the third party element by way of the communication link,
where the first swarm element and the second swarm element operate in a decentralized manner.

14. The system of claim 13,
where the information set comprises cost-based information.

15. The system of claim 13,
where the information set comprises time-based information.

16. The system of claim 13,
where the information set comprises efficiency-based information.

17. The system of claim 13,
where the information set comprises information on if a requirement is met.

18. The system of claim 13,
where the information set comprises location temperature information.

19. The system of claim 13,
where the information set comprises compensation information.

20. A system comprising:
a communication component configured to establish a communication link with a swarm, which comprises a first swarm element that functions, at least in part, as a first database and a second swarm element that functions, at least in part, as a second database, and a swarm candidate, wherein the communication component is distributed in a partially redundant manner across elements of the swarm as a plurality of communication parts; where individual parts of the plurality of communication parts comprise parts for establishing the communication link and parts for protecting the communication link and sending at least one message to other elements of the swarm;
an identification component configured to perform a security check on the swarm candidate to verify that the swarm candidate is verified to become part of the swarm; and
a management component configured to cause the swarm candidate to become part of the swarm when the security check indicates that swarm candidate is verified and cause the swarm candidate to be rejected in becoming part of the swarm when the security check indicates that the swarm candidate is not verified, where the communication link is between at least the first element and the second element,
where the first element and the second element operate in a decentralized manner, where the first element and the swarm candidate operate in a decentralized manner when the swarm candidate becomes part of the swarm, and
where the second element and the swarm candidate operate in a decentralized manner when the swarm candidate becomes part of the swarm.

* * * * *